(12) United States Patent
Yomo et al.

(10) Patent No.: US 12,313,724 B2
(45) Date of Patent: May 27, 2025

(54) RADAR APPARATUS AND RADAR SYSTEM

(71) Applicant: Panasonic Intellectual Property Management Co., Ltd., Osaka (JP)

(72) Inventors: Hidekuni Yomo, Kanagawa (JP); Tomohiro Yui, Kanagawa (JP); Kenta Iwasa, Tokyo (JP); Junji Sato, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 333 days.

(21) Appl. No.: 17/992,520

(22) Filed: Nov. 22, 2022

(65) Prior Publication Data

US 2023/0080655 A1 Mar. 16, 2023

Related U.S. Application Data

(63) Continuation of application No. PCT/JP2021/019710, filed on May 25, 2021.

(30) Foreign Application Priority Data

May 29, 2020 (JP) .................................. 2020-094259

(51) Int. Cl.
- *G01S 13/46* (2006.01)
- *G01S 13/04* (2006.01)
- *G01S 13/89* (2006.01)

(52) U.S. Cl.
CPC .............. *G01S 13/46* (2013.01); *G01S 13/04* (2013.01); *G01S 13/89* (2013.01); *G01S 2013/464* (2013.01)

(58) Field of Classification Search
CPC combination set(s) only.
See application file for complete search history.

(56) References Cited

U.S. PATENT DOCUMENTS

| | | |
|---|---|---|
| 2018/0341012 A1 | 11/2018 | Takada |
| 2020/0346653 A1* | 11/2020 | Kondo ..................... G01S 13/08 |
| 2021/0255356 A1* | 8/2021 | Vu .......................... G01V 8/005 |

FOREIGN PATENT DOCUMENTS

| | | |
|---|---|---|
| JP | 2005-128603 A | 5/2005 |
| JP | 2016-148547 A | 8/2016 |

(Continued)

OTHER PUBLICATIONS

International Search Report (including English Language Translation), mailed Aug. 17, 2021, by the Japan Patent Office (JPO), in International Application No. PCT/JP2021/019710.

(Continued)

*Primary Examiner* — Vladimir Magloire
*Assistant Examiner* — Eric K Hodac
(74) *Attorney, Agent, or Firm* — Greenblum & Bernstein, P.L.C.

(57) ABSTRACT

False detection of a ghost is prevented. A radar apparatus includes: transmission circuitry, which, in operation, transmits a radar signal; main reflective object detection circuitry, which, in operation, detects a main reflective object in a detection area using a reflected wave of the radar signal; in-area determination circuitry, which, in operation, determines a main area where a ghost caused by a reflective object outside the detection area and the main reflective object is located, the main area being inside the detection area; and auxiliary reflective object detection circuitry, which, in operation, detects a position of an auxiliary reflective object in the main area using a reception signal of the reflected wave of the radar signal, the auxiliary reflective object being located farther than the main reflective object on an extension of a line connecting the radar apparatus and the main reflective object.

8 Claims, 23 Drawing Sheets

(56) References Cited

FOREIGN PATENT DOCUMENTS

| | | |
|---|---|---|
| JP | 2018-200173 A | 12/2018 |
| JP | 2019-124623 A | 7/2019 |

OTHER PUBLICATIONS

English language translation of Office Action from Japan Patent Office (JPO) in Japanese Patent Appl. No. 2020-094259, dated Oct. 17, 2023.

* cited by examiner

RADAR APPARATUS AND RADAR SYSTEM

TECHNICAL FIELD

The present disclosure relates to a radar apparatus and a radar system.

BACKGROUND ART

In recent years, a radar apparatus using a millimeter-wave band, in which
deterioration in detection performance is relatively low even in inclement weather such as snow or fog, has been drawing attention as a sensor for ensuring safety such as preventing collision or for realizing autonomous driving. The radar apparatus is expected to be applied to an infrastructure to monitor intersections or roads, as well as unauthorized entry of suspicious persons, etc., and the application is expanding as an all-weather sensor. In particular, such application scenarios require the implementation of a two-dimensional angle-measuring radar (3D radar) that enables imaging, albeit coarse, by detecting the vertical elevation angle in addition to the conventional horizontal azimuth angle.

CITATION LIST

Patent Literature

PTL 1
Japanese Patent Application Laid-Open No. 2019-124623

SUMMARY OF INVENTION

One non-limiting and exemplary embodiment of the present disclosure facilitates providing a system capable of preventing false detection of a ghost by distinguishing between a real reflective object and a ghost caused by multipath resulting from reflection by a reflective object.

A radar apparatus according to an embodiment of the present disclosure includes: transmission circuitry, which, in operation, transmits a radar signal: main reflective object detection circuitry, which, in operation, detects a main reflective object in a detection area using a reflected wave of the radar signal; in-area determination circuitry, which, in operation, determines a main area where a ghost caused by a reflective object outside the detection area and the main reflective object is located, the main area being inside the detection area; and auxiliary reflective object detection circuitry, which, in operation, detects a position of an auxiliary reflective object in the main area using a reception signal of the reflected wave of the radar signal, the auxiliary reflective object being located farther than the main reflective object on an extension of a line connecting the radar apparatus and the main reflective object.

It should be noted that general or specific embodiments may be implemented as a system, an apparatus, a method, or any selective combination thereof.

According to an exemplary embodiment of the present disclosure, it is possible to provide a system capable of preventing false detection of a ghost by distinguishing between a real reflective object and a ghost caused by multipath resulting from reflection by a reflective object.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
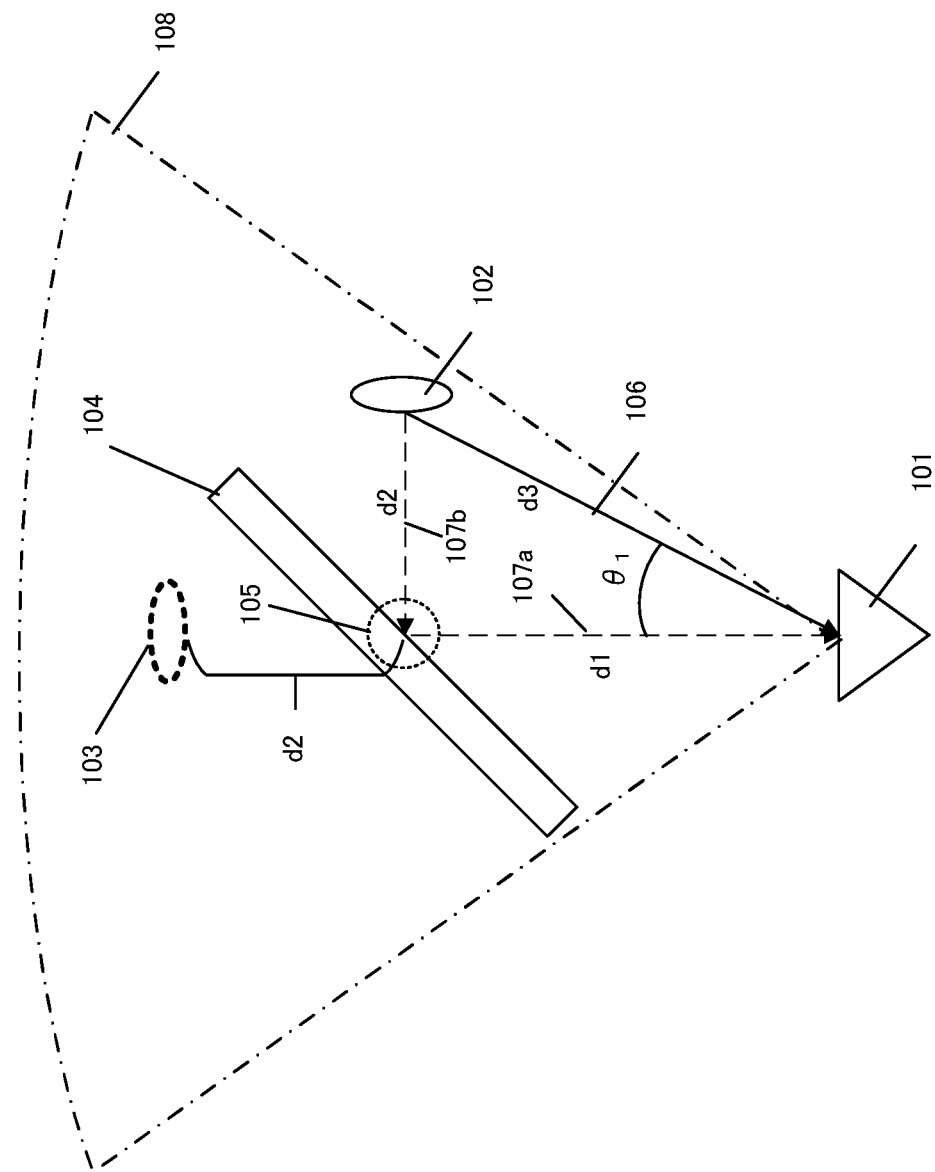
FIG. 1 schematically illustrates a relationship between multipath and a ghost.

The present disclosure relates to, for example, a radar apparatus using a radio signal in a millimeter-wave band, and a technique for preventing a reflective object present outside of a viewing angle covering a detection target area from being detected inside of the viewing angle as a false image due to an effect of multipath caused by a reflective object (e.g., mirror reflective object) present inside of the viewing angle. It is assumed that the radar apparatus of the present disclosure is fixedly installed as a road light installed on the roadside and an infrastructure to monitor unauthorized entry, for example. The present disclosure is not limited thereto, however, and may be applied to a radar apparatus mounted on a moving object such as a vehicle.

Incidentally, how a radio wave works as a wave will be discussed. Regarding reflection, the law of reflection holds that the angle of incidence of light is equal to the angle of reflection. Here, the angle of incidence and the angle of reflection are defined as the angle between the traveling direction of the respective light and the perpendicular line of the boundary surface. That is, when visible light is incident from an angle that is not perpendicular to the reflective surface, the light is reflected in a direction different from the incident direction, so that the light does not return in the incident direction. This causes multipath at the reflection point. Note that the reflective surface includes a mirror surface.

Not only light but also a radio wave has such a property as a wave. Note that a radio wave (millimeter-wave band) has a wavelength longer than that of light, and thus the reflective surface need not be almost flat. The reflective surface has the mirror property when its unevenness is negligible relative to the wavelength of the radio wave. Under such a condition, the radio wave works the same as the light on the reflective surface, and multipath is caused at the reflection point. Thus, the radar apparatus using a millimeter-wave band is more likely to have multipath than an optical system sensor.

Due to the multipath by the reflective surface, a conventional radar apparatus is more likely to detect a false image (hereinafter, referred to as a ghost) that can be regarded as if an object is present in a position where it is not actually present.

Incidentally, a radar apparatus has been proposed which actively utilizes the ghost to detect in advance an object in an area where a direct wave does not reach at an intersection with poor visibility (see, for example, PTL 1). The conventional radar apparatus identifies a reflective surface observation point, calculates the perpendicular direction to a reflective surface, determines a reflection point observed on a far side of the reflective surface (far from the reflective surface with respect to the radar apparatus) as a ghost, and determines a position in a mirror-image relationship with the reflection point as a true position of the object. Note that the operation of the conventional radar apparatus is based on the assumption that the reflection point observed on the far side of the reflective surface is a ghost and not a real object.

Further, the conventional one-dimensional angle-measuring radar (two-dimensional radar) has a narrow viewing angle in the vertical direction, and thus, when there is an object that can be regarded as a reflective surface, it is assumed that most of the transmitted radio waves are blocked by the reflective surface and the reflected wave from the object (target) present in an area farther than the reflective surface does not reach the radar. Thus, the conventional one-dimensional angle-measuring radar has no problem assuming that the detection target detected farther than the reflective surface is a ghost as described above. Further, on the road, a sidewalk, a building, a wall, or the like is present behind a guardrail, which can be the reflective surface, in many cases: accordingly, the conventional one-dimensional angle-measuring radar mounted on a vehicle does not expect a movable object with a relatively large radar cross-section (RCS) such as another vehicle.

FIG. 1 schematically illustrates a relationship between a ghost and multipath reflected by an object (hereinafter, referred to as a mirror reflective object) that has a surface with negligible unevenness relative to the wavelength and has a mirror property with respect to a radio wave (transmission signal) in a millimeter-wave band. FIG. 1 illustrates radar apparatus 101, real reflective object 102, which is an existing object in detection area 108 of radar apparatus 101, ghost reflective object 103, which is a ghost, mirror reflective object 104 present in detection area 108 of radar apparatus 101, multipath reflection point 105, direct wave route (solid line) 106, multipath routes (dashed lines) 107a and 107b, and detection area (dashed and dotted line) 108. Note that FIG. 1 illustrates reflection waves reflected by real reflective object 102, and does not illustrate a transmission signal transmitted by radar apparatus 101.

A radio wave transmitted from a transmitter of radar apparatus 101 reaches real reflective object 102 directly, and the reflected wave reaches radar apparatus 101 through direct wave route 106. The direction of arrival of the reflected wave obtained by direct wave route 106 is estimated as direction $\theta_1$ of real reflective object 102.

In FIG. 1, due to mirror reflective object 104, a radio wave reached and reflected by real reflective object 102 (multipath route 107b) passes multipath reflection point 105 and reaches radar apparatus 101 through multipath route 107a, in addition to the reflected wave through direct wave route 106. When a reflected wave is reached through multipath route 107a, radar apparatus 101 estimates that the direction of multipath reflection point 105, which is in front of radar apparatus 101, is the direction of arrival of the reflected wave: 00=0° (not illustrated).

The path length of multipath routes 107a and 107b includes not only distance d1 from multipath reflection point 105 to radar apparatus 101 by multipath route 107a but also distance d2 from real reflective object 102 to multipath reflection point 105 by multipath route 107b. Thus, ghosting occurs in a position in the direction of arrival of the reflected wave, which is the direction of multipath reflection point 105, with additional distance (d2) equivalent from real reflective object 102 to multipath reflection point 105, that is, in a position of ghost reflective object 103 (distance d1+d2). Note that radar apparatus 101 receives only the reflected wave through direct wave route 106 when there is no mirror reflective object 104 and multipath routes 107a and 107b are not caused.

Incidentally, the signal level detected in the position of ghost reflective object 103 is lower than the signal level detected in the position of real reflective object 102. This is because distance (d1+d2) between ghost reflective object 103 and radar apparatus 101 is longer than distance d3 between real reflective object 102 and radar apparatus 101, and also, the signal level is attenuated by reflection at multipath reflection point 105.

Thus, when the position or angle of mirror reflective object 104 can be detected accurately and both real reflective object 102 and ghost reflective object 103 are detected, radar apparatus 101 can estimate that the real object is in the position of real reflective object 102 and the ghost is in the position of ghost reflective object 103 based on the geometric positional relationship, difference in the signal level, etc.

Figure 2:
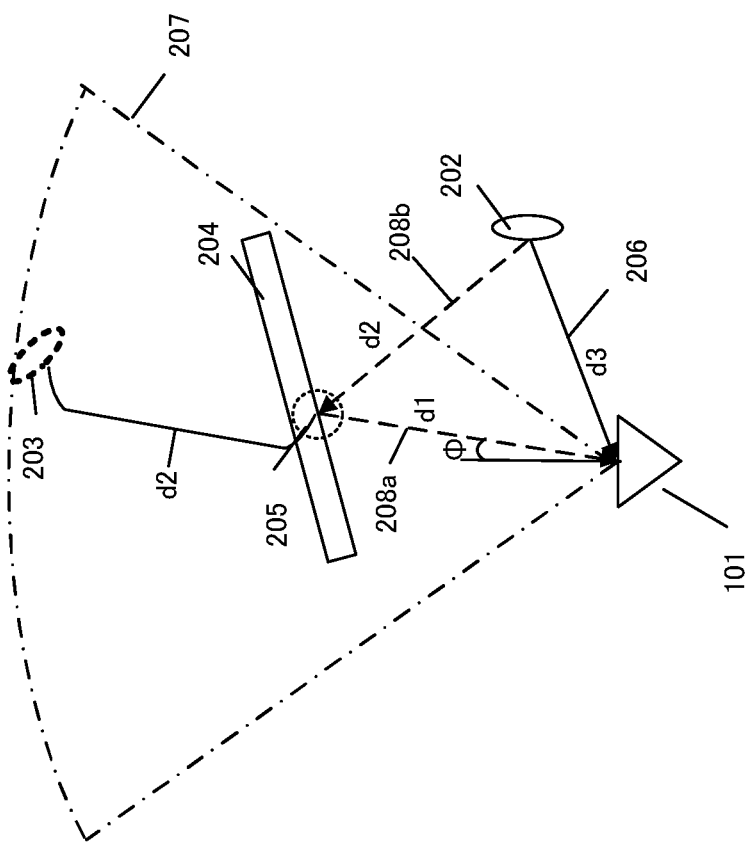
FIG. 2 schematically illustrates a relationship between multipath and a ghost in a case where a real reflective object is located outside a detection area.

Next, a description will be given of a situation where a ghost reflective object is detected in a detection area of a radar apparatus while a real reflective object is not detected in the accurate position because it is located outside the detection area. FIG. 2 schematically illustrates a relationship between multipath with a mirror reflective object as a reflection point and a ghost in a case where the real reflective object is located outside the detection area. FIG. 2 illustrates radar apparatus 101, real reflective object 202 outside the detection area, ghost reflective object 203, mirror reflective object 204 in the detection area, multipath reflection point 205, direct wave route 206 (solid line), detection area 207, and multipath routes 208a and 208b (dashed lines). Note that a signal transmitted from radar apparatus 101 is not illustrated as in FIG. 1.

A radio wave reflected through direct wave route 206 among radio waves transmitted from a transmitter (not illustrated) is outside detection area 207, and thus radar apparatus 101 does not detect real reflective object 202. Meanwhile, radar apparatus 101 receives, as a reflected wave, a radio wave reached and reflected from real reflective object 202 through multipath routes 208a and 208b via multipath reflection point 205 of mirror reflective object 204.

For multipath route 208a, radar apparatus 101 estimates that direction q of multipath reflection point 205 is the direction of arrival of the reflected wave.

Note that the path length of multipath routes 208a and 208b includes not only distance d1 from multipath reflection point 205 to radar apparatus 101 by multipath route 208a but also distance d2 from real reflective object 202 to multipath reflection point 205 by multipath route 208b. Thus, ghost reflective object 203 is generated as a false image in a position in the direction of arrival of the reflected wave, which is the direction φ of multipath reflection point 205, with additional distance (d2) equivalent from real reflective object 202 to multipath reflection point 205 (the position corresponding distance d1+d2).

Figure 3:
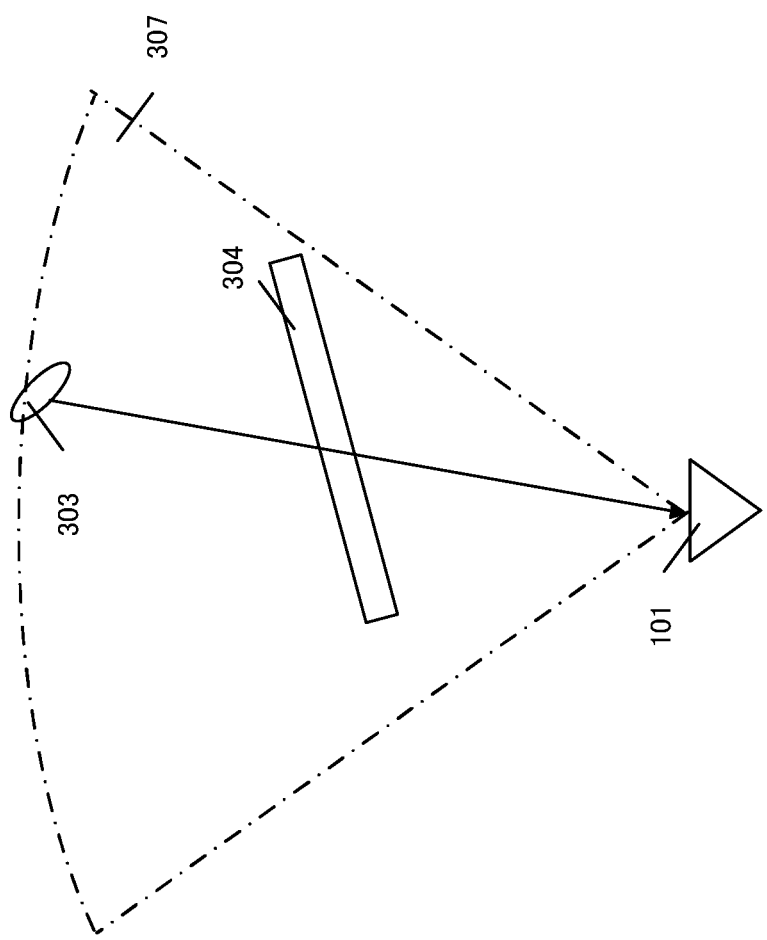
FIG. 3 schematically illustrates a case where a real reflective object is located in a detection area.

FIG. 3 schematically illustrates a case where the real reflective object is located in the detection area. FIG. 3 illustrates radar apparatus 101, real reflective object 303, mirror reflective object 304, and detection area 307.

Note that, in a case where radar apparatus 101 has a sufficient viewing angle in the height direction and the height of mirror reflective object 304 is lower than the viewing angle of radar apparatus 101 in the height direction, real reflective object 303 farther than mirror reflective object 304 can be detected by radio wave diffraction.

The signal level of the reflected wave as a direct wave from real reflective object 303 received by radar apparatus 101 is higher than the signal level of the reflected wave of ghost reflective object 203 illustrated in FIG. 2. This is because the reflected wave from ghost reflective object 203 illustrated in FIG. 2 is the reflected wave from real reflective object 202 outside detection area 207 and the signal level is attenuated due to multipath reflection.

The signal level of the reflected wave received by radar apparatus 101, however, varies depending on the radar cross-section (RCS) of mirror reflective object 304. Thus, it is practically difficult for radar apparatus 101 to use the signal level of the received reflected wave to determine whether it is real reflective object 303 or ghost reflective object 203. In addition, radar apparatus 101 fails to detect real reflective object 202 outside detection area 207 in FIG. 2, and thus it is also difficult to determine from a geometric property using the direction of arrival of direct wave route 206.

Embodiment 1

A description will be given of a method for determining a ghost caused by an object present outside a detection area of a radar apparatus. Note that the detection area is an area where detection is performed by a radar apparatus having a predetermined viewing angle and varies depending on the installation position of the radar apparatus.

Figure 4:
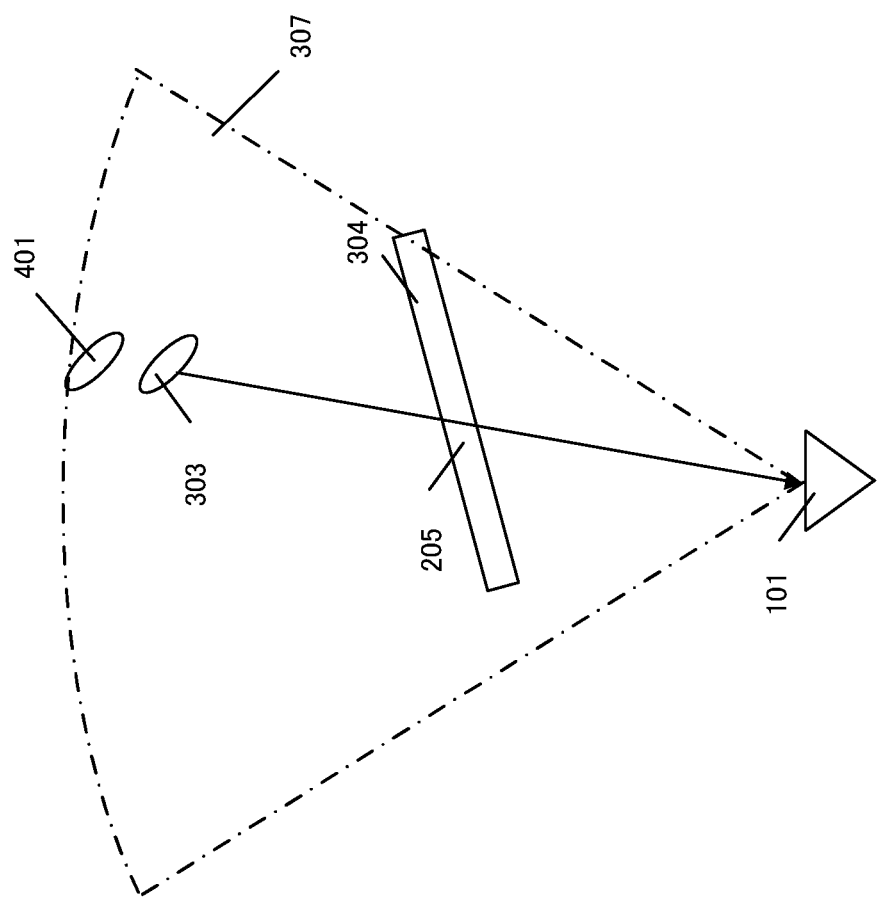
FIG. 4 schematically illustrates a case where a real reflective object is present on the extension of the line connecting a radar apparatus and another real reflective object, according to Embodiment 1.
Figure 5:
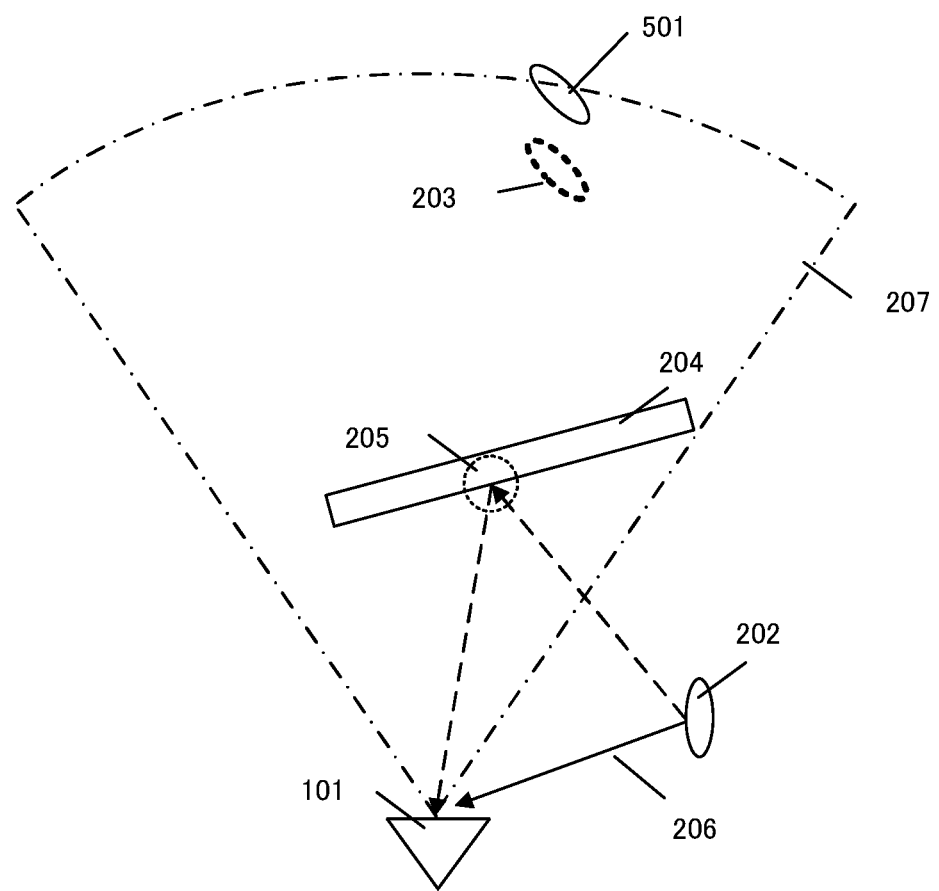
FIG. 5 schematically illustrates a case where ghosting occurs on the extension of the line connecting the radar apparatus and a real reflective object, according to Embodiment 1.

FIG. 4 schematically illustrates a case where a real reflective object is present on the extension of the line connecting a radar apparatus and another real reflective object, according to the present embodiment. FIG. 5 schematically illustrates a case where ghosting occurs on the extension of the line connecting the radar apparatus and a real reflective object, according to the present embodiment.

The case illustrated in FIG. 4 will be discussed where a real reflective object is present on the extension of the line connecting radar apparatus 101 and real reflective object 303. The real reflective object is auxiliary reflective object 401 used for determining a ghost. A radio wave directly reaching auxiliary reflective object 401 is attenuated to a very small level obtainable by radio wave diffraction, due to shadowing blocked by real reflective object 303.

Meanwhile, as illustrated in FIG. 5, in a case where auxiliary reflective object 501 is present in a position corresponding to the position of auxiliary reflective object 401 in FIG. 4, a radio wave directly reaching auxiliary reflective object 501 is not blocked by ghost reflective object 203, and thus the reflected wave is not attenuated.

That is, in a case where there is a known real reflective object, radar apparatus 101 observes a shadowing effect when a determination target detected between the known real reflective object and radar apparatus 101 is a real reflective object and does not observe a shadowing effect when it is a ghost.

With this regard, in the present embodiment, in determining whether ghosting occurs due to a transmission wave from radar apparatus 101 and a reflected wave from a real object (target) being reflected by a reflective object (mirror reflective object 204), radar apparatus 101 identifies the position of the reflective object (mirror reflective object 204), extracts a real reflective object (auxiliary reflective object 501) present farther than the reflective object (mirror reflective object 204) with respect to radar apparatus 101, observes temporal variations in the signal level of a reflected wave from the real reflective object (auxiliary reflective object 501), and then determines the presence or absence of a ghost based on whether the signal level of the reflected wave from the real reflective object (auxiliary reflective object 501) varies due to shadowing.

Figure 6:
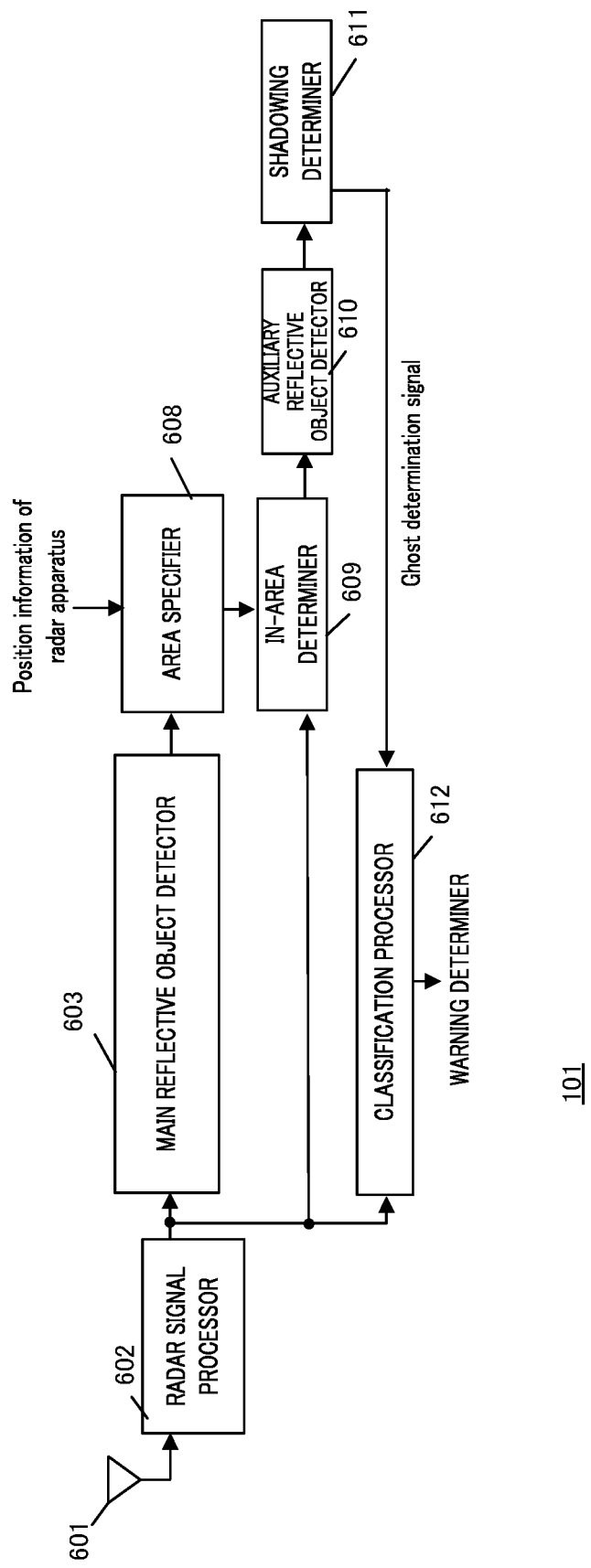
FIG. 6 illustrates an exemplary configuration of the radar apparatus according to Embodiment 1.

FIG. 6 illustrates an exemplary configuration of the radar apparatus according to the present embodiment. The system in FIG. 6 is composed of antenna 601, radar signal processor 602, main reflective object detector 603, area specifier 608, in-area determiner 609, auxiliary reflective object detector 610, shadowing determiner 611, and classification processor 612.

Figure 7:
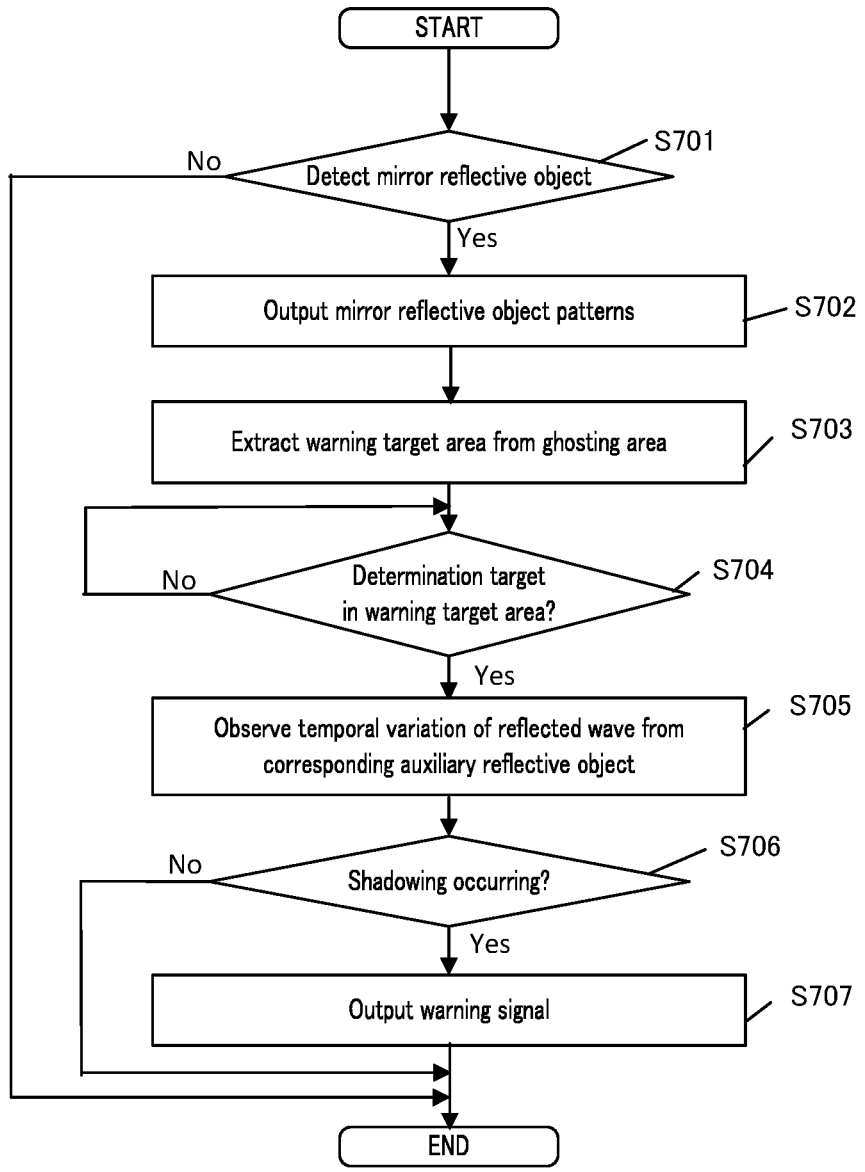
FIG. 7 is a flowchart describing an exemplary procedure of actual measurement by the radar apparatus according to Embodiment 1.

FIG. 7 is a flowchart describing an exemplary procedure of actual measurement by the radar apparatus according to the present embodiment. The configuration of radar apparatus 101 in FIG. 6 will be described along with the procedure of actual measurement by the radar apparatus.

Antenna 601 receives a reflected radio wave of a signal transmitted by a transmitter (not illustrated). Radar signal processor 602 detects the position, velocity, strength, etc. of a determination target from the reflected radio wave received at antenna 601.

Classification processor 612 assigns individual identification numbers (IDs) to detected objects for point cloud data detected and outputted by radar signal processor 602, and selects, from the detected objects to which the IDs are assigned, a detected object corresponding to a ghost determination signal inputted from shadowing determiner 611. Note that classification processor 612 does not output a warning signal or outputs a warning signal indicating a possibility of ghosting to a warning determiner (not illustrated) in accordance with the inputted ghost determination signal. Note that classification processor 612 may perform processing on the point cloud data, such as clustering processing for grouping by a predetermined algorithm and tracking processing for tracking the clustered signals over time, for example, and assign individual IDs to the point cloud data when a predetermined condition (e.g., reception level, tracking duration, etc.) is satisfied.

In pre-measurement, main reflective object detector 603 determines whether candidates for mirror reflective object 204 have been detected from the state of reflection detected by radar signal processor 602 (step S701). When candidates for mirror reflective object 204 have not been detected (step S701: No), radar apparatus 101 may end the procedure in FIG. 7 and perform usual processing, classification processing section 612 may perform the clustering processing or the tracking processing on the point cloud data, assign IDs when a predetermined condition is satisfied. When candidates for mirror reflective object 204 have been detected (step S701: Yes), main reflective object detector 603 estimates the area, angle, and center position for each detected mirror reflective object 204 in the pre-measurement. Main reflective object detector 603 stores as patterns of predetermined mirror reflective object 204 (hereinafter referred to as mirror reflective object patterns) in accordance with the obtained estimation results. Note that, in the actual measurement, main reflective object detector 603 compares the state of the reflection detected by radar signal processor 602 with the stored mirror reflective object patterns, and outputs the closest mirror reflective object pattern to area specifier 608 (step S702).

Area specifier 608 outputs the area where a ghost is possibly detected (hereinafter referred to as a ghosting area) determined by the mirror reflective object pattern inputted from main reflective object detector 603. Further, area specifier 608 extracts a warning target area in the ghosting area where ghosting possibly occurs by a real reflective object outside the detection area, based on the geometric positional relationship between mirror reflective object 204 and radar apparatus 101 (step S703).

Note that area specifier 608 may determine in advance the ghosting area and warning target area where a ghost is possibly detected for each of the various mirror reflective object patterns by a method to be described in Embodiment 1, and store the data in area specifier 608 as a look-up table. As a result, the radar device 101 can skip the calculation every time, thereby enabling high-speed processing.

Here, when the detection target is a human being and the position of a reflective object of a determination target is at a height where no human being is considered to be present from the surrounding condition, for example, area specifier 608 can eliminate the reflective object of the determination target. In a case where an object moving in the air, such as a drone, is also a detection target, however, it is preferable not to configure the restriction in the height direction.

In-area determiner 609 determines whether a determination target is present in the warning target area specified by area specifier 608 from among the output signals outputted by radar signal processor 602 (step S704). When a determination target is not included in the warning target area (step S704: No), auxiliary reflective object detector 610 may repeat the determination on the determination target in the warning target area (step S704).

When a determination target is included in the warning target area (step S704: Yes), auxiliary reflective object detector 610 checks whether a real reflective object is present on an extension line extending in the direction of the determination target with radar apparatus 101 as the end.

When auxiliary reflective object detector 610 detects a real reflective object, shadowing determiner 611 observes temporal variations for the received reflected wave from the real reflective object (step S705), and determines whether shadowing occurs (step S706).

When shadowing determiner 611 determines that the variation in the signal level is equal to or less than a predetermined value and no shadowing occurs (step S706: No), the determination target is considered to be a ghost, and thus shadowing determiner 611 may control the warning determiner of a control apparatus (not illustrated) so as not to warn the ghost that is detected falsely. In this case, shadowing determiner 611 inputs a ghost determination signal indicating that the determination target is a ghost to classification processor 612, and classification processor 612 need not input the determination result to the warning determiner. Alternatively, shadowing determiner 611 may output, to the warning determiner (not illustrated), a warning signal indicating the presence of a reflective object that is possibly a ghost. In this case, classification processor 612 may output a warning signal indicating a possibility of a ghost to the warning determiner (not illustrated) when it is highly likely to be a ghost but not confirmed.

When shadowing determiner 611 determines that shadowing occurs (step S706: Yes), the determination target is considered to be actually present, and thus shadowing determiner 611 may control the warning determiner of the control apparatus (not illustrated) to warn as a real reflective object. Note that the result of shadowing determiner 611 indicates that it is highly likely to be real but not confirmed, classification processor 612 may output a warning signal indicating a possibility of a ghost to the warning determiner (not illustrated) (step S707).

Figure 8:
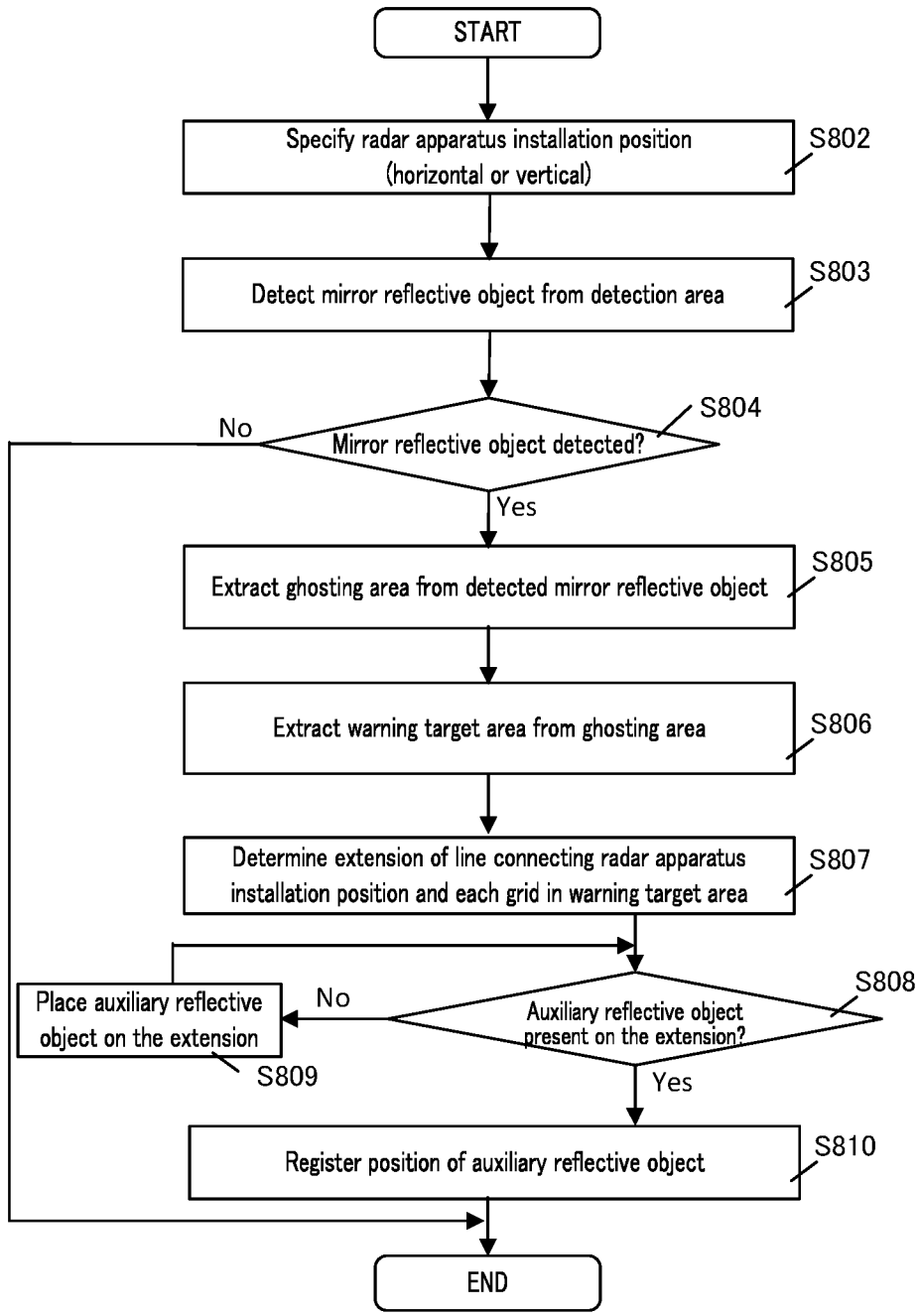
FIG. 8 is a flowchart describing an exemplary procedure for installing the radar apparatus according to Embodiment 1.

Note that radar apparatus 101 is assumed to be installed fixedly in the present embodiment but it may be installed movably. FIG. 8 is a flowchart describing an exemplary procedure for fixed installation of the radar apparatus. That is, FIG. 8 describes a preparation procedure before the actual measurement.

First, after a radar apparatus is installed in a predetermined installation location, radar apparatus 101 determines the radar installation position (horizontal or vertical) (step S802). The installation position may be determined by a user input, for example. Alternatively, it may be determined using a global positioning system (GPS), for example.

Next, main reflective object detector 603 detects mirror reflective object 204 starting from the specified radar installation position or its vicinity (step S803).

Figure 9:
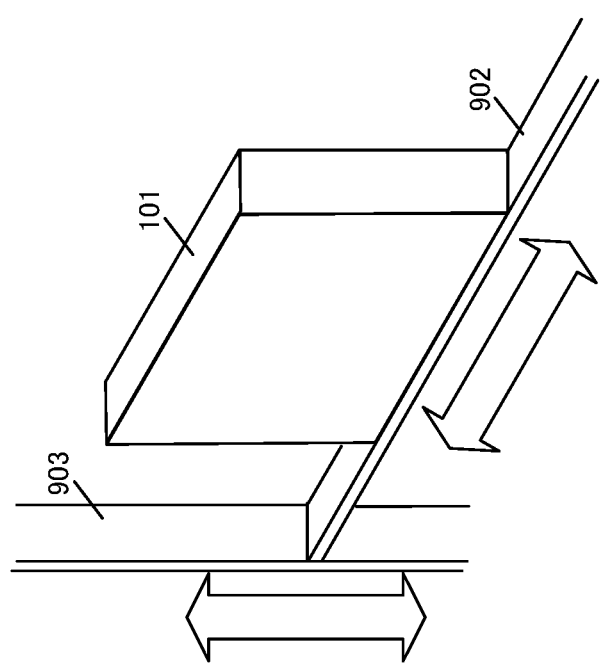
FIG. 9 illustrates an exemplary tool used for detecting a reflective object candidate according to Embodiment 1.

Here, main reflective object detector 603 included in a fixed radar apparatus may be used for detecting mirror reflective object 204 as a tool, but for example, as illustrated in FIG. 9, it is also preferable to use a device in which a mechanism can operate radar apparatus 101 including main reflective object detector 603 precisely in the vertical and horizontal directions (horizontal direction 902 and vertical direction 903) and capable of repeatedly measuring after shifting a predetermined amount and acquiring data.

Note that, by using all the data acquired by operating radar apparatus 101 in the vertical and horizontal directions, radar apparatus 101 can constitute a synthetic aperture radar, allowing for higher resolution. The minimum value of the shift amount to be configured is an integer multiple of the minimum array spacing in the virtual antenna array arrangement obtained by the combination of transmission and reception antennas, which is suitable for reducing an effect of sidelobes, for example, in estimation calculation for the direction of arrival of a reflected wave.

In addition, to detect mirror reflective object 204, not only the radar apparatus that uses a millimeter wave band and includes main reflective object detector 603 but also a 3-dimensional light detection and ranging (3D-LiDAR), for example, is suitably used. The 3D-LiDAR uses wavelengths shorter than the millimeter wave band as its medium, and its superior angular resolution makes it easy to distinguish a mirror shape, for example. In some cases, however, it is difficult to measure from the position corresponding to the installation position of radar apparatus 101 in the present embodiment.

In this case, the 3D-LiDAR may be used by its offset position and installation angle being estimated and adjusted. Note that, to estimate the offset position and the installation angle, radar apparatus 101 and the 3D-LiDAR determine the positions of a plurality of (at least about three) reflective objects placed in an area where the detection areas of both radar apparatus 101 and the 3D-LiDAR are overlapped. The 3D-LiDAR preferably searches for and narrows down to the optimal combination of the offset amount and the installation angle in the global coordinates offline after the measurement so that the determined positions match the positions detected by radar apparatus 101. Note that metaheuristics, for example, may be used as a method of searching for the optimal combination.

Note that processing will be easier for both radar apparatus 101 and the 3D-LiDAR when installed in the horizontal direction. To narrow down to the optimal combination, the 3D-LiDAR may search for a combination to minimize the sum of positional errors estimated for the plurality of reflective objects by changing five parameters: offset position (x, y, z), elevation angle θ, and azimuth angle φ, using a computer or the like.

Next, main reflective object detector 603 determines whether mirror reflective object 204 has been detected in the search for mirror reflective object 204 (step S804). When no mirror reflective object 204 is detected (step S804: No), this pre-measurement is terminated. When mirror reflective object 204 is detected (step S804: Yes), in contrast, area specifier 608 extracts a ghosting area where ghosting possibly occurs based on the installation position of radar apparatus 101 and a group of lines connecting to the edge of mirror reflective object 204 (step S805).

Figure 10:
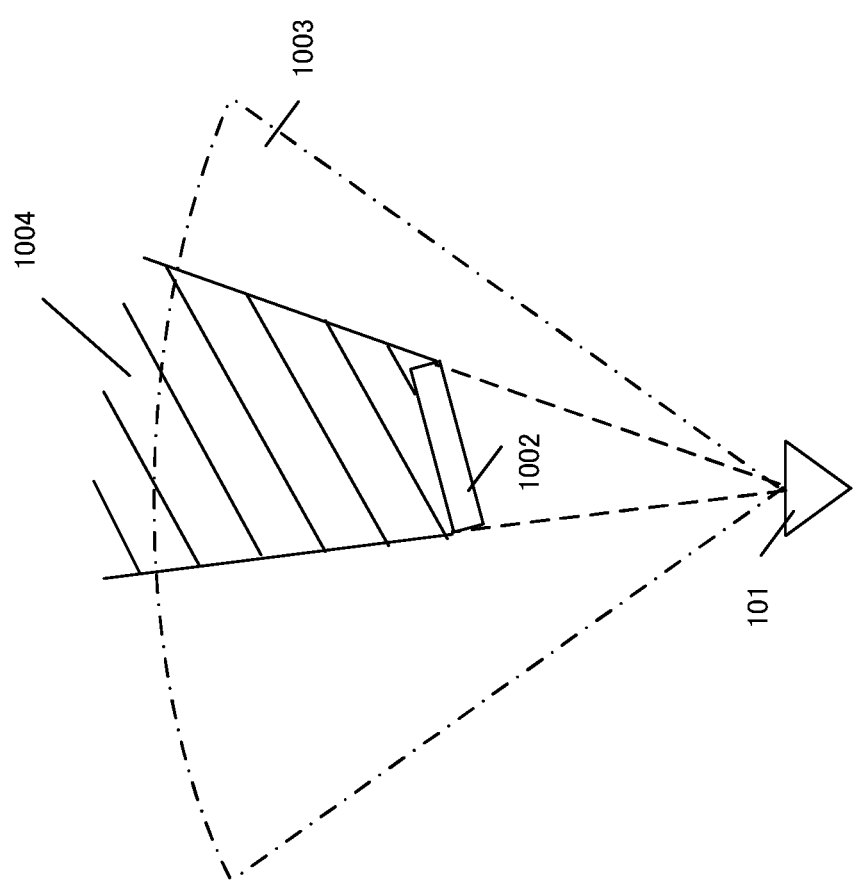
FIG. 10 schematically illustrates an exemplary ghosting area according to Embodiment 1.

Here, in a case where the radar apparatus is limited to performing one-dimensional angle measurement, the area where ghosting possibly occurs is ghosting area 1004 in FIG. 10. FIG. 10 illustrates radar apparatus 101, mirror reflective object 1002, and detection area 1003.

In a case where radar apparatus 101 is capable of performing two-dimensional angle measurement, the ghosting area can be specified as a three-dimensional space. In this case, radar apparatus 101 may limit the calculation target by grasping the shape of the ground and limiting to the area above the ground.

Subsequently, area specifier 608 further extracts, from the extracted ghosting area 1004, an area (e.g., warning target area) where ghosting possibly occurs due to a real reflective object present outside the detection area (step S806).

Figure 11:
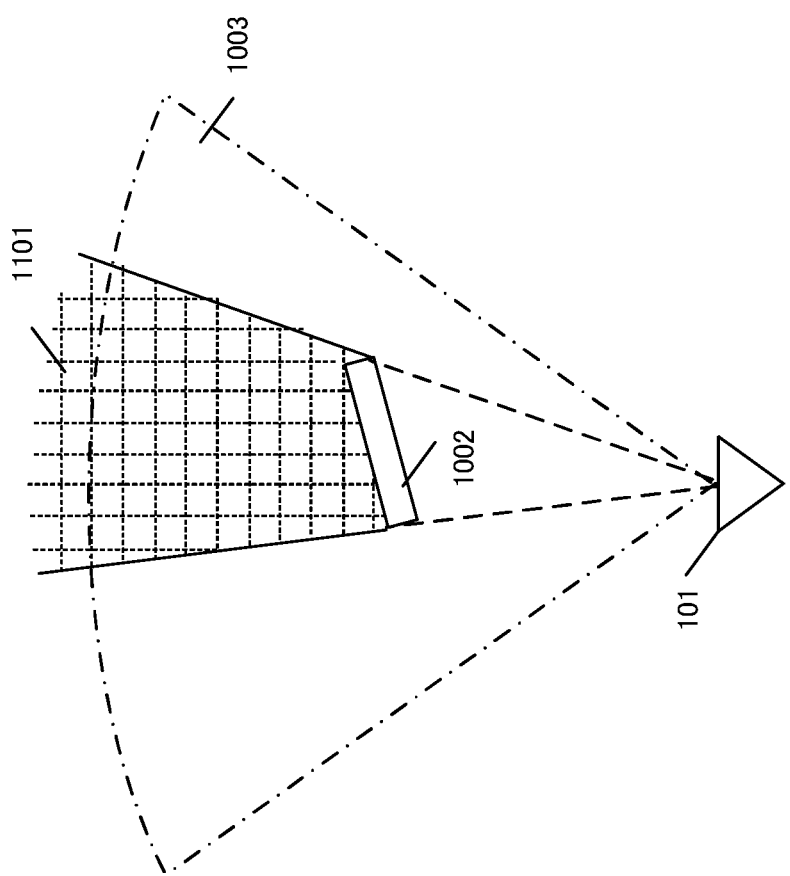
FIG. 11 schematically illustrates exemplary grid pattern according to Embodiment 1.
Figure 12:
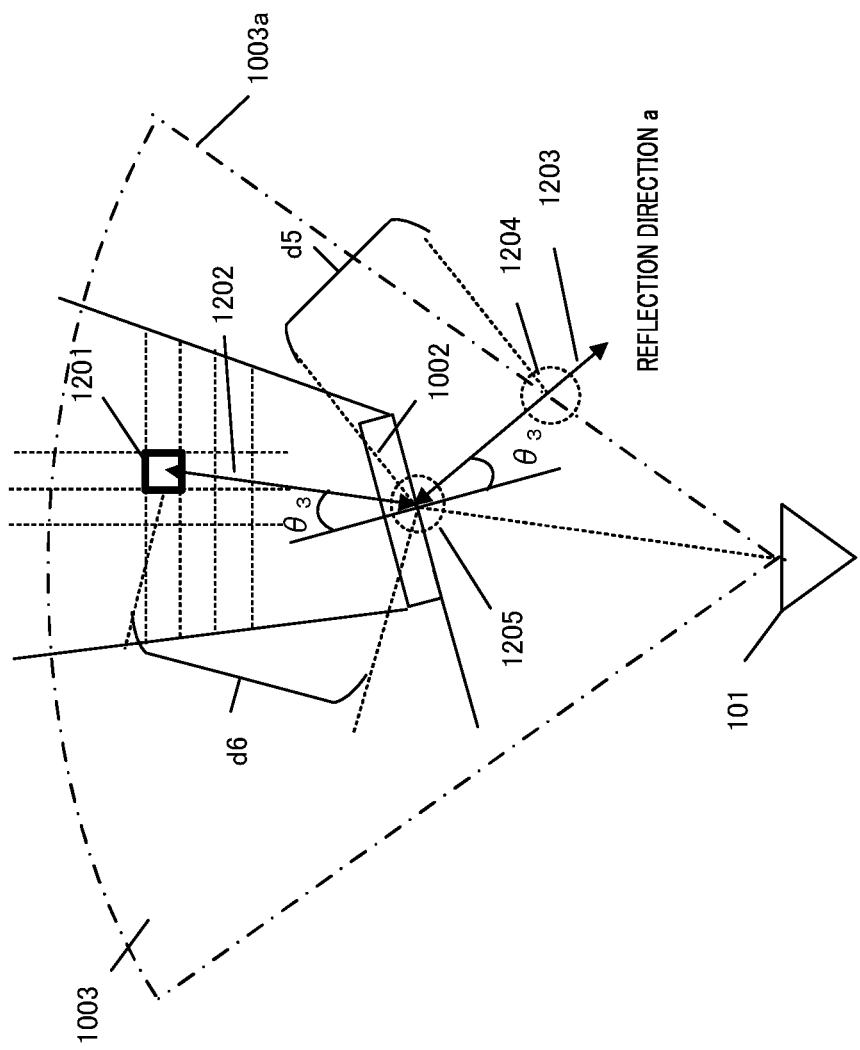
FIG. 12 schematically illustrates an exemplary method for detecting a warning target area according to Embodiment 1.

To be more specific, area specifier 608 divides the extracted three-dimensional space into squares of about 10 cm, for example. FIG. 11 illustrates an image of a space divided in grid pattern 1101 in a case where radar apparatus 101 is limited to performing one-dimensional angle measurement. In FIG. 12, area specifier 608 focuses on single square 1201 and determines whether this square 1201 is in a position where ghosting possibly occurs due to a real reflective object outside detection area 1003.

Area specifier 608 draws a line connecting the center of square 1201 and radar apparatus 101 and focuses on line 1202 extending from square 1201 to the intersection with mirror reflective object 1002. When the angle of incidence of this line on the mirror surface is angle θ3, line 1203 with reflection angle θ3 and the same length as line 1202 is a multipath route to a real reflective object. In FIG. 12, line 1203 intersects with the edge of the detection area at point 1204 and reaches outside detection area 1003. Thus, area specifier 608 determines that square 1201 is the area where ghosting possibly occurs due to a real reflective object outside detection area 1003.

Figure 13:
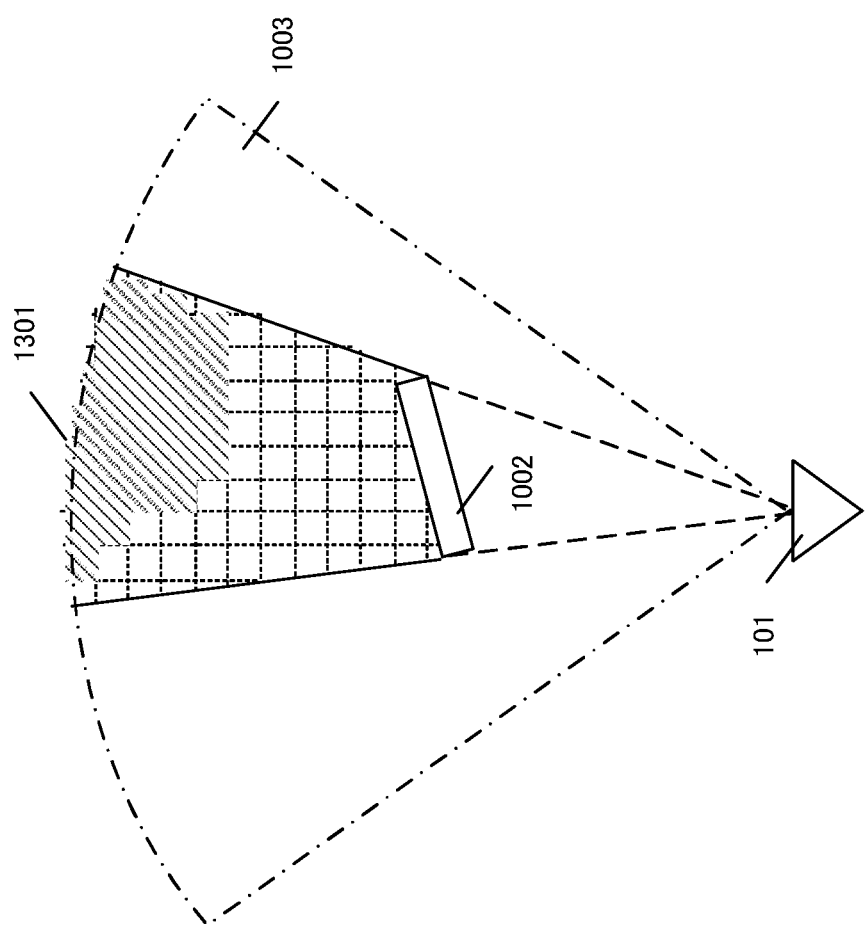
FIG. 13 schematically illustrates an exemplary warning target area according to Embodiment 1.

Area specifier 608 performs the same determination on all squares in grid pattern 1101 to specify the warning target area where ghosting occurs due to a real reflective object outside detection area 1003, the example of which is warning target area 1301 in FIG. 13.

In a case where radar apparatus 101 to be used is capable of performing two-dimensional (azimuth angle and elevation angle) angle measurement, area specifier 608 determines reflection direction "a" of a wave inputted from radar apparatus 101 to mirror reflective object 1002 at point 1205 where line 1202 connecting the center of square 1201 and radar apparatus 101 intersects with mirror reflective object 1002.

Area specifier 608 draws line 1203 in the determined reflection direction "a", and determines distance d5 from point 1205 of mirror reflective object 1002 to point 1204 where line 1203 intersects with outer edge 1003a of detection area 1003 determined by a specification of the viewing angle of radar apparatus 101.

When the determined distance d5 is shorter than distance d6 from the center of square 1201 to point 1205 of mirror reflective object 1002, area specifier 608 determines that square 1201 is warning target area 1301 where ghosting occurs due to a real reflective object outside detection area 1003.

Area specifier 608 performs the above processing on all squares in the grid pattern in ghosting area 1004 and determines warning target area 1301.

Figure 14:
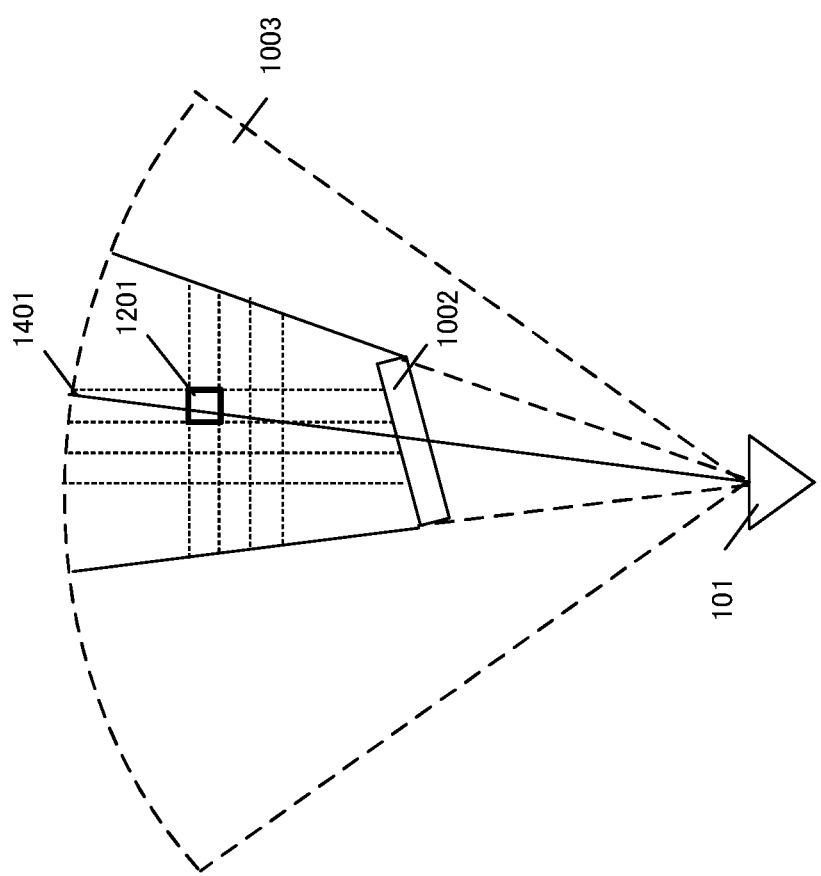
FIG. 14 schematically illustrates an exemplary extension line toward a square in a grid pattern according to Embodiment 1.

Next, area specifier 608 derives extension line 1401 of a line connecting radar apparatus 101 and each of the squares in grid pattern 1101 in warning target area 1301 extracted in step S806 (step S807). FIG. 14 illustrates a case where radar apparatus 101 is limited to performing one-dimensional angle measurement, and extension line 1401 is a half line extending toward square 1201 with radar apparatus 101 as the end.

Then, auxiliary reflective object detector 610 determines whether a reflective object is present on extension line 1401, as a process of detecting an auxiliary reflective object (step S808). When it is determined that no reflective object is present (step S808: No), a user operating radar apparatus 101 preferably places auxiliary reflective object 501 on extension line 1401 (step S809).

Here, in a case where it is difficult to place reflective objects on all the extension lines, area specifier 608 may register in advance the position as a position where it is difficult to guarantee that shadowing occurs.

Note that, when a reflective object is detected in an area where no auxiliary reflective object 501 is placed, radar apparatus 101 may output a detection result including a possibility of ghost reflective object 203.

The system can also determine taking into consideration a plurality of factors. For example, when there is no weather influence, such as snowfall or fog, and information from another sensor, such as an optical camera, can be used in addition to radar apparatus 101, the system increases reliability of a detection result by another sensor to determine, and when it is difficult for another sensor to detect accurately due to the weather influence, the system increases reliability of a detection result by radar apparatus 101.

When auxiliary reflective object detector 610 confirms that auxiliary reflective objects 501 are placed on all the extension lines or when registration is completed for a position where it is difficult to determine whether a real reflective object is present on extension line 1401 (step S808: Yes), the procedure proceeds to step S810. In step S810, auxiliary reflective object detector 610 registers the positions where auxiliary reflective objects 501 are placed on the extension lines, and targets the positions to determine whether shadowing occurs in the actual measurement. This preparation procedure is then terminated.

As described above, it is possible to effectively distinguish between a ghost caused by multipath with mirror reflective object 1002 as a reflection point and a real reflective object present farther than the reflection point of mirror reflective object 1002 from radar apparatus 101, thereby realizing radar apparatus 101 that prevents a false detection caused by a ghost. Incorporating radar apparatus 101 into a road light, for example, makes it possible to accurately capture a warning issued to prevent a traffic accident, and incorporating it into an intrusion detection and monitoring system for suspicious persons makes it possible to accurately capture an intrusion of a suspicious person.

For example, in the case of the intrusion detection and monitoring system for suspicious persons, it is assumed that the monitoring targets are diverse and various mirror reflective objects are present besides a guardrail. Since a reflective object is possibly present farther than a reflection point of the mirror reflective object, radar apparatus 101 determines whether it is a ghost or a real reflective object.

Embodiment 2

In Embodiment 1, a description has been given of a method of measuring, in a detection area, a warning target area and ghosting area where ghosting possibly occurs, and other areas where ghosting is unlikely to occur using a geometric method in pre-measurement. In the present embodiment, for example, a description has been given of a method of pre-measuring, in a detection area, a warning target area and ghosting area where ghosting possibly occurs, and other areas where ghosting is unlikely to occur using an object having a Doppler component different from that of its body portion, such as an unmanned aerial vehicle (hereinafter referred to as a drone).

Figure 15A:
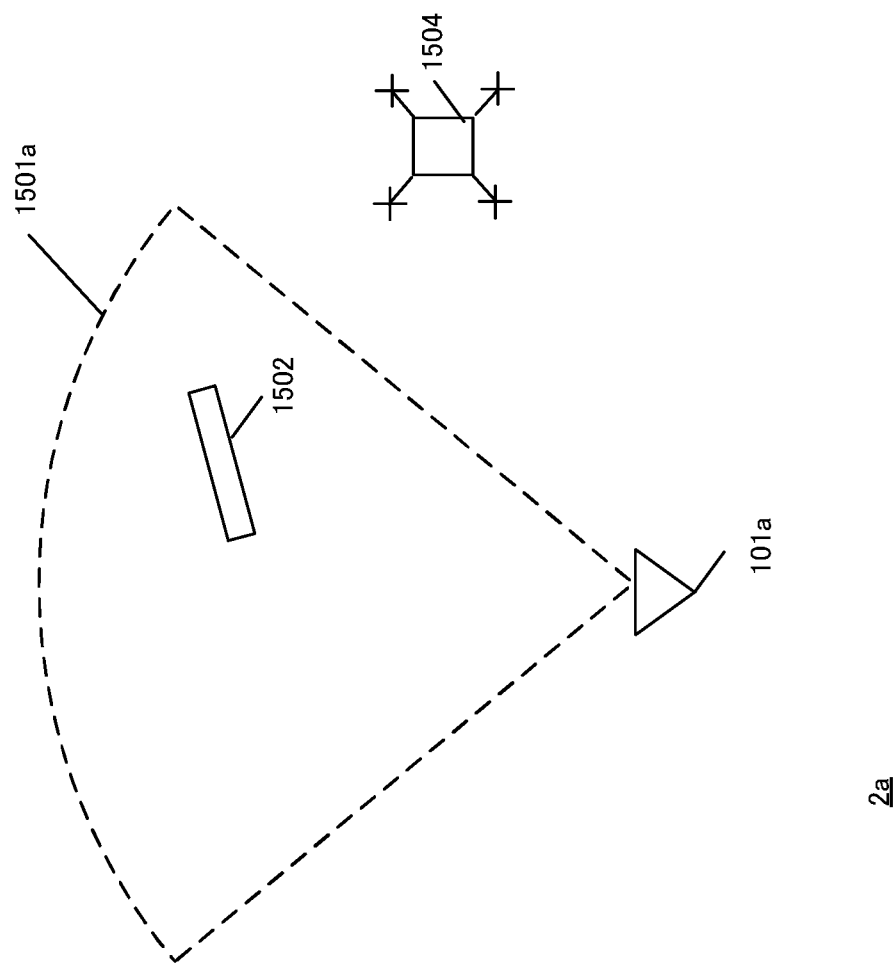
FIG. 15A schematically illustrates a radar system according to Embodiment 2.

FIG. 15A illustrates radar system 2a of the present embodiment. Radar system 2a of the present embodiment includes radar apparatus 101a installed in a position to perform actual measurement (detection area 1501a) and drone 1504. In pre-measurement, radar system 2a causes drone 1504 to fly inside and outside detection area 1501a and specifies the position of a ghost generated due to a positional relationship between drone 1504 and mirror reflective object 1502 in detection area 1501a.

Figure 15B:
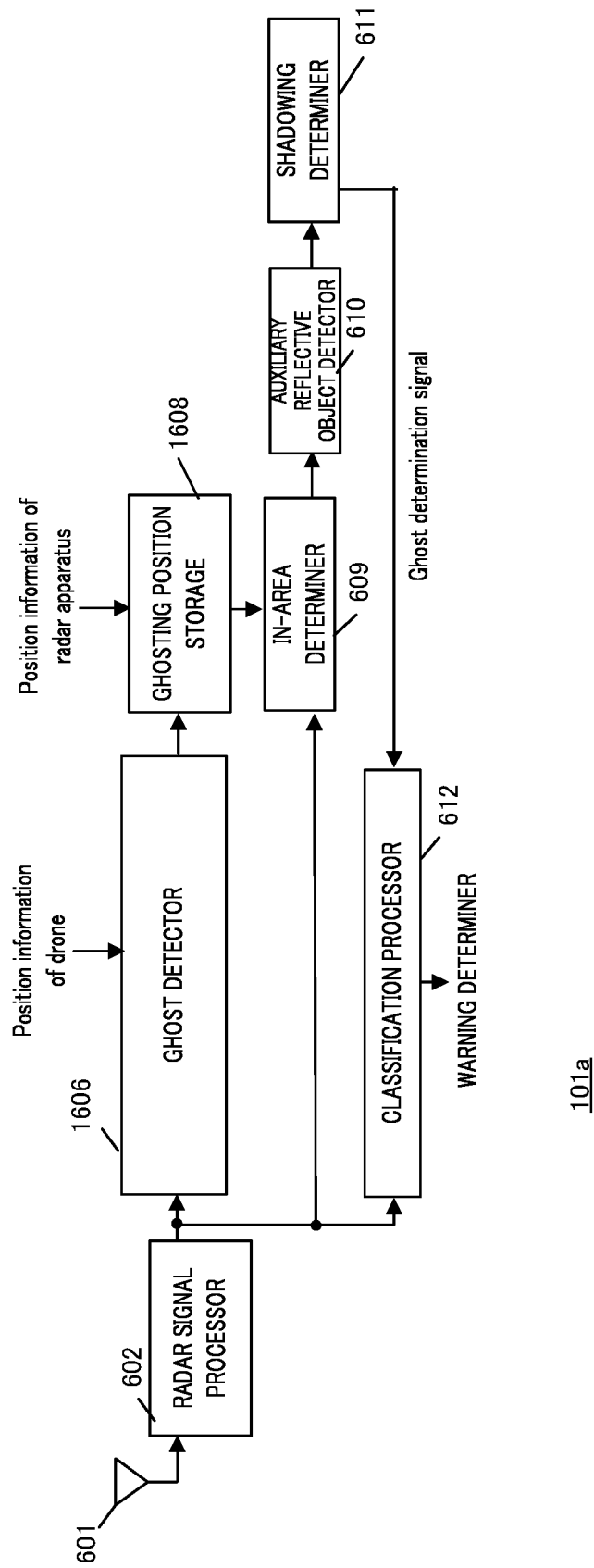
FIG. 15B illustrates an exemplary configuration of a radar apparatus according to Embodiment 2.

FIG. 15B illustrates a configuration of radar apparatus 101a of the present embodiment. For radar apparatus 101a of the present embodiment in FIG. 15B, main reflective object detector 603 is replaced by ghost detector 1606, and area specifier 608 is replaced by ghosting position storage 1608 compared to radar apparatus 101 in FIG. 6. Position information of the drone is inputted to ghost detector 1606. Blocks with the same reference signs in FIG. 6 and FIG. 15B operate in the same manner, and thus the description thereof is omitted here.

Radar apparatus 101a is installed in a position where a monitoring area and detection area 1501a of radar apparatus 101a are overlapped. Radar apparatus 101a causes drone 1504 to fly inside and outside detection area 1501a in the pre-measurement.

Note that an exemplary method of acquiring the position information of the drone is mounting a position information acquiring unit by GPS on the drone, transmitting the acquired position information through radio communication, and inputting it to ghost detector 1606. In a case where an operator of the drone is able to see entire detection area 1501a, the operator may input whether it is inside detection area 1501a to ghost detector 1606 as the position information of the drone by the drone separately flying inside and outside detection area 1501a.

Incidentally, a condition of ghost detection is that a reflective object having the same characteristics as those of drone 1504 is detected at a location different from the actual position of drone 1504. Note that, even when drone 1504 is hovering in the same location, a Doppler component caused by rotating blades is extracted and drone 1504 operates differently from other stationary objects. Thus, drone 1504 has a Doppler component of the hovering body and a Doppler component of the rotating blades. The characteristics of the Doppler components of drone 1504 are also detected for a ghost caused by drone 1504.

First, drone 1504 is caused to fly inside detection area 1501a, and when two reflective objects are detected in detection area 1501a, ghost detector 1606 confirms the above characteristics of the Doppler components of drone 1504, and then compares the position information of the drone and the estimated positions of the reflective objects detected by radar apparatus 101a. When the position information and the estimated position disagree, the detected reflective object is a ghost by drone 1504. Thus, ghost detector 1606 outputs the area to ghosting position storage 1608 as a ghosting area where ghosting possibly occurs.

Ghost detector 1606 determines that the detected reflective object is not a ghost but a real reflective object (drone 1504) when a single reflective object is detected, it has the characteristics of the Doppler components of drone 1504, and the position information of drone 1504 matches the estimated position of the reflective object detected by radar apparatus 101a. Note that ghost detector 1606 may determine that the reflective object is not drone 1504 and exclude from pre-measurement targets when the detected reflective object does not have the characteristics of the Doppler components of drone 1504.

Next, drone 1504 is caused to fly outside detection area 1501a, and when a single reflective object is detected in detection area 1501a, ghost detector 1606 confirms that the reflective object includes the characteristics of the Doppler components of drone 1504, and then checks whether the position information of drone 1504 disagrees with the estimated position of the reflective object detected by radar apparatus 101a. Ghost detector 1606 determines that the detected reflective object is a ghost when the position information of drone 1504 disagrees with the estimated position of the reflective object detected by radar apparatus 101a, and outputs the area to ghosting position storage 1608 as a warning target area where ghosting possibly occurs.

Note that, in a case where the actual position of the drone causing a ghost is inside detection area 1501a, radar system 2a simultaneously detects both the ghost and a real reflective object in radar apparatus 101a.

Note that, by using the position of mirror reflective object 1502 grasped in the pre-measurement, it is possible, during an actual operation (during actual measurement), to easily distinguish between a ghost and a real reflective object applying a conventional technique based on a geometrical relationship between these positions.

Meanwhile, in a case where the actual position of a reflective object causing a ghost is outside detection area 1501a during the actual operation (during the actual measurement), it is difficult to distinguish between a ghost caused by mirror reflective object 1502 and a real reflective object, and thus radar system 2a may determine whether it is a ghost using a ghosting position that is grasped in the present pre-measurement using a drone and stored in ghosting position storage 1608.

As described above, using drone 1504 in the pre-measurement makes it possible to measure, in a detection area, a warning target area where ghosting possibly occurs and other areas where ghosting is unlikely to occur without using a geometric method.

Variation of Embodiment 2

Although a single radar apparatus 101a measures the position of drone 1504 in Embodiment 2, another radar apparatus may be added to acquire the position information of the drone.

Figure 16A:
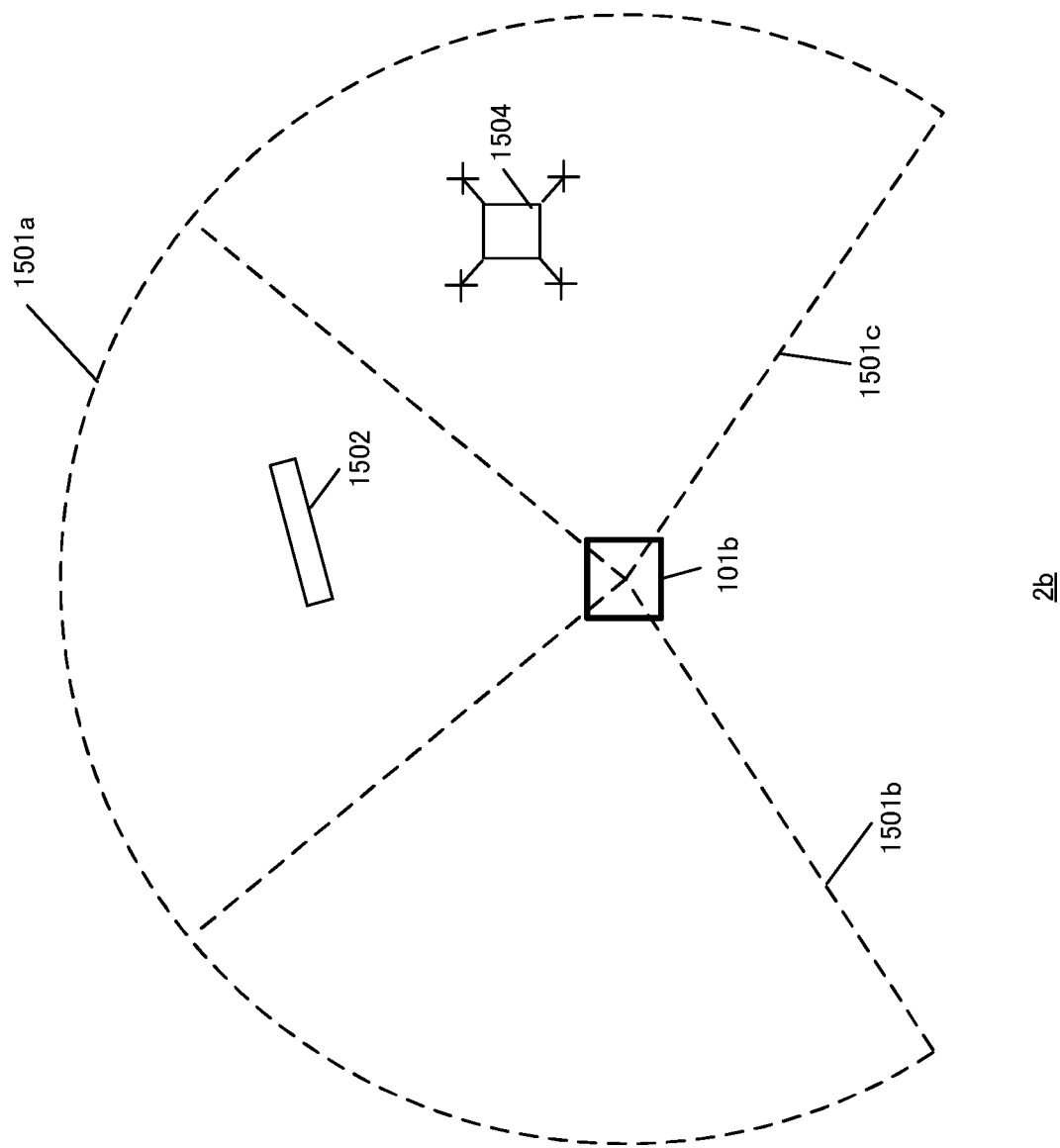
FIG. 16A schematically illustrates a radar system according to a variation of Embodiment 2.

FIG. 16A illustrates radar system 2b of a variation of the present embodiment. Radar system 2b of the present embodiment includes radar apparatus 101b with detection area 1501a of the radar apparatus installed during the actual operation (actual measurement) and detection areas 1501b and 1501c used for measuring the position of drone 1504, and drone 1504. In the pre-measurement, radar system 2b causes drone 1504 to fly inside detection area 1501b and detection area 1501c, which are outside detection area 1501a, and determines the position of a ghost generated due to a positional relationship between drone 1504 and mirror reflective object 1502 in detection area 1501a.

Figure 16B:
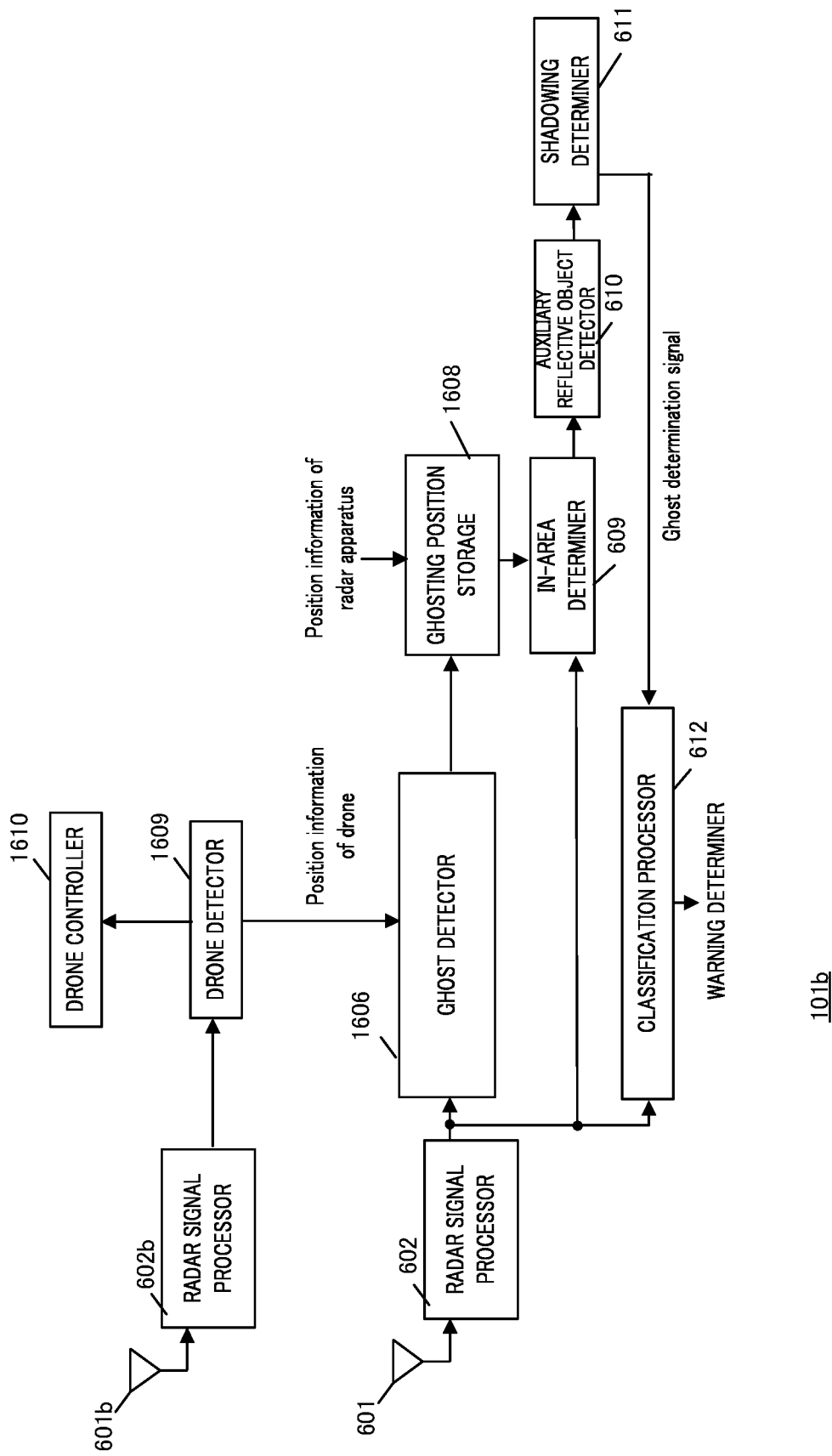
FIG. 16B illustrates an exemplary configuration of a radar apparatus according to the variation of Embodiment 2.

FIG. 16B illustrates a configuration of radar apparatus 101b of the present embodiment. For radar apparatus 101b of the present embodiment in FIG. 16B, antenna 601b, radar signal processor 602b, drone detector 1609, and drone controller 1610 are added to radar apparatus 101a in FIG. 15B. Blocks with the same reference signs in FIGS. 6, 15B, and 16B operate in the same manner, and thus the description thereof is omitted here.

Antenna 601b receives reflected radio waves from detection areas 1501b and 1501c. Radar signal processor 602b detects the position, velocity, strength, etc. of drone 1504, for example, from the reflected radio waves received at antenna 601b.

Ghosting position storage 1608b converts the coordinates of reflective objects detected by antenna 601 and antenna 601b to global coordinates, and stores the coordinate-converted ghost detection positions.

Note that, in the global coordinate conversion, a method similar to the method described in Embodiment 1 may be used to estimate the installation position, angle, etc. of antenna 601b used for detecting a drone, for example, and the description thereof will be omitted.

Ghost detector 1606 receives position information of the drone in detection areas 1501b and 1501c detected by drone detector 1609 and compares the information with information of a reflective object detected in detection area 1501a by radar signal processor 602. Ghost detector 1606 determines the reflective object as a ghost when the detected positions of the two information portions are different from each other. Ghost detector 1606 can improve reliability of the ghost determination by confirming that the characteristics of the Doppler components of the reflective object detected in detection area 1501a and the characteristics of the Doppler components of the drone detected by drone detector 1609 are consistent with each other.

Then, ghosting position storage 1608 stores the detected position of the reflective object detected in detection area 1501a as a warning target area where ghosting possibly occurs.

When the position information of the drone is not inputted from drone detector 1609 because drone 1504 is present in detection area 1501a and information indicating detection of two reflective objects from radar signal processor 602 is inputted, ghost detector 1606 determines whether the detected two reflective objects have the characteristics of the Doppler components of the drone.

When ghost detector 1606 determines that the two detected reflective objects have the characteristics of the Doppler components of the drone, ghosting position storage 1608 determines that the reflective object located farther than mirror reflective object 1502, which is separately detected, is a ghost, and stores the detected position of the farther reflective object as a ghosting area where ghosting possibly occurs.

Note that, when a real reflective object causing a ghost is drone 1504 and the position of drone 1504 is inside detection area 1501a, ghosting position storage 1608 need not store the position where the ghost is detected since radar system 2b can distinguish between a real reflective object and a ghost geometrically in the actual measurement (actual operation) as long as radar system 2b knows the position of the mirror reflective object.

Meanwhile, when drone 1504 is present in detection area 1501b or 1501c outside detection area 1501a, ghosting position storage 1608 stores the position where a ghost is detected in detection area 1501a.

Note that drone detector 1609 may detect drone 1504 by determining a difference from a pre-measured reception signal in a situation where drone 1504 is not present.

Drone controller 1610 controls drone 1504. It is also suitable to configure drone controller 1610 so as to control a flight path of drone 1504 based on the position information acquired from drone detector 1609.

As described above, the ghosting area and the warning target area can be derived by using a drone without using a geometric method for a main reflective object as in Embodiment 1.

For example, in a case where a surface of a main reflective object (mirror reflective object 1502) is not in a simple shape but has a complex uneven structure, ghosting may occur outside ghosting area 1004 illustrated in FIG. 10 depending on the shape of the surface of the main reflective object, so that it is assumed to be difficult to accurately derive the ghosting area and the warning target area illustrated in FIG. 12 using a geometric method.

In a case of using drone 1504, in contrast, an area where ghosting has actually occurred by drone 1504 can be determined to be the warning target area, thereby facilitating the pre-measurement.

That is, in the present embodiment, it is possible to derive the warning target area accurately and facilitate the pre-measurement by using a movable object from which a plurality of Doppler components are detected, such as drone 1504, when radar apparatus 101 is installed.

Embodiment 3

In the present embodiment, a description will be given of a case where a radar apparatus is mounted on a vehicle and moved, for example. Note that radar apparatus 101 in FIG. 6 will be used in the present embodiment, and thus descriptions of the components will be omitted. In a case where radar apparatus 101 in FIG. 6 moves, it is difficult to perform pre-measurement and place auxiliary reflective object 501 in FIG. 5 in advance.

Figure 17:
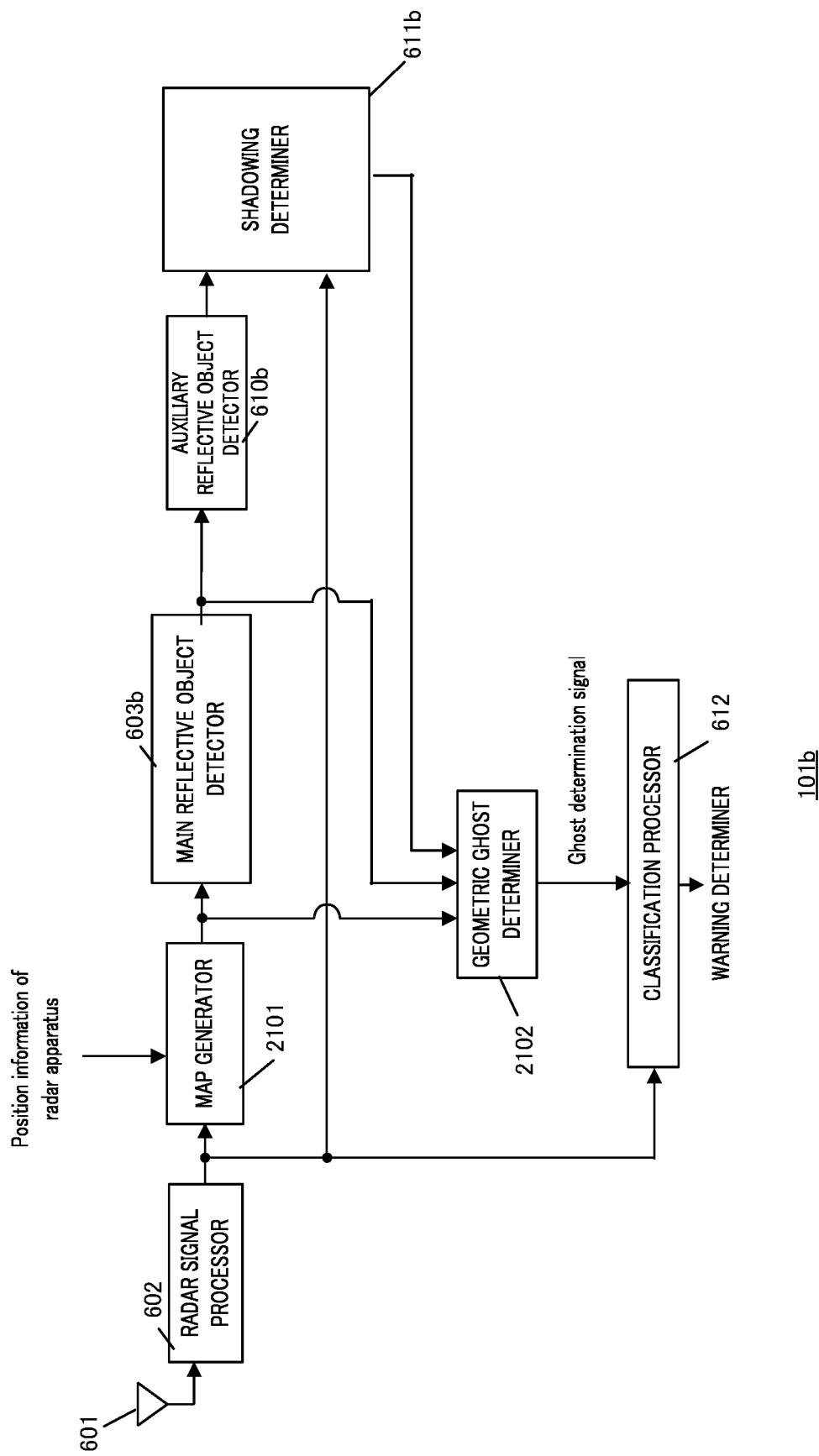
FIG. 17 illustrates an exemplary configuration of a radar apparatus according to Embodiment 3.

First, a method without using auxiliary reflective object 501 will be described. FIG. 17 illustrates an exemplary configuration of a radar apparatus of the present embodiment.

Radar apparatus 101b in FIG. 17 has a configuration including the blocks in FIG. 6 excluding area specifier 608 and in-area determiner 609, map generator 2101, and geometric ghost determiner 2102. Note that descriptions of the blocks with the same reference signs as in FIG. 6 will be omitted.

Map generator 2101 uses, as input, a radar signal processing result and position information of radar apparatus 101b for obtaining a path of radar apparatus 101b moved between time to and time $t_1$, and generates a map based on the observed radar signal processing result. In the map generation, map generator 2101, for example, subtracts the movement vector that is based on the moving path of radar apparatus 101b, and performs processing such that a reflection point from the same stationary object is overwritten on the same coordinates at each point in time. That is, map generator 2101 generates a map using, for example, a method of occupancy grid mapping (OGM), and outputs the map to main reflective object detector 603b and geometric ghost determiner 2102.

Geometric ghost determiner 2102 uses, as input, the map information generated by map generator 2101, information of mirror reflective object 204 detected by main reflective object detector 603b (e.g., area, angle, and center position), and a shadowing determination result from shadowing determiner 611b, and outputs, as a ghost determination signal to classification processor 612 in the latter stage, the position of a detection target that is highly likely to be a ghost from among radar processing results at time $t_1$.

Figure 18:
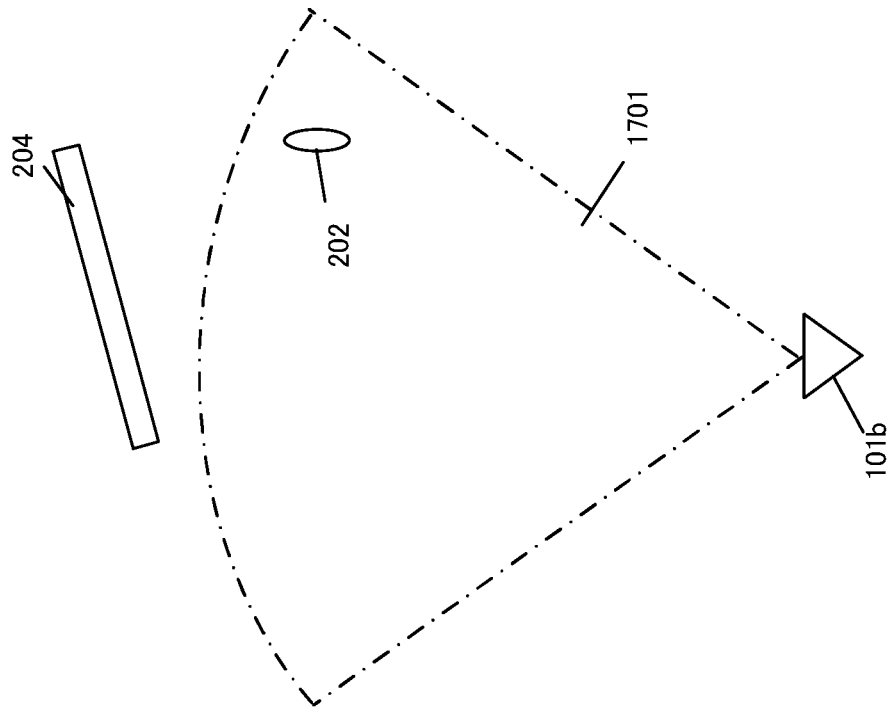
FIG. 18 schematically illustrates an exemplary radar system at time to according to Embodiment 3.
Figure 19:
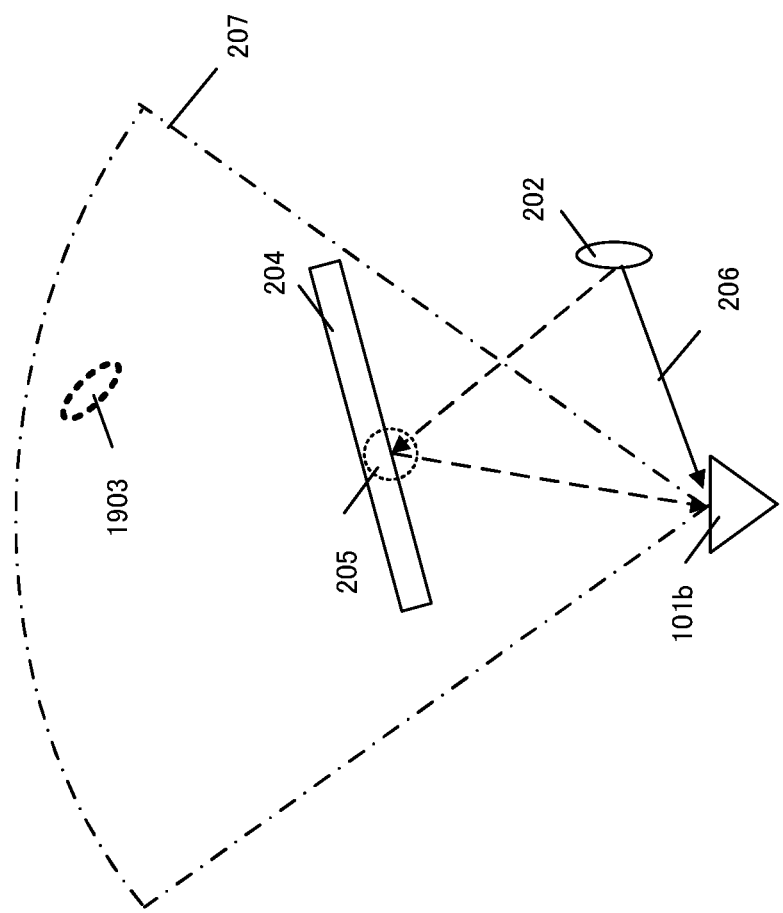
FIG. 19 schematically illustrates an exemplary radar system at time $t_1$ according to Embodiment 3.

Note that FIG. 18 schematically illustrates an exemplary radar system at time to according to Embodiment 3. FIG. 19 schematically illustrates an exemplary radar system at time $t_1$ according to Embodiment 3.

Here, during the movement, radar apparatus 101b stores real reflective object 202 detected at time to (FIG. 18), and then determines whether real reflective object 202, which is located outside detection area 207 of radar apparatus 101b at time $t_1$, causes a ghost by mirror reflective object 204 detected at time $t_1$ (FIG. 19).

Radar signal processor 602 of radar apparatus 101b inputs, for example, real reflective object 202 detected at time to, mirror reflective object 204 detected at time $t_1$, and reflective object candidate 1903 to map generator 2101. Map generator 2101 generates a map as illustrated in FIG. 19. Auxiliary reflective object detector 610b detects a reflective object that functions as an auxiliary reflective object for the detected main reflective object (mirror reflective object 204) and real reflective object 202 detected at time to. Note that no auxiliary reflective object is detected in FIG. 19. Shadowing determiner 611b may determine whether a ghost reflective object is a ghost by comparing the variations in the signal level of reflected waves at different elevation angles in the horizontal direction (multipath reflection point 205) in which a ghost is expected to be present from the map.

Assuming that reflective object candidate 1903 is a ghost, a reflection surface of mirror reflective object 204 is substantially perpendicular to the ground, and the ground is substantially horizontal, for example, a reflected wave from real reflective object 202 outside the detection area is strong at an elevation angle lower than the height of mirror reflective object 204, and a reflected wave from real reflective object 202 outside the detection area is weak at an elevation angle higher than the height of mirror reflective object 204; accordingly, shadowing determiner 611b may determine that reflective object candidate 1903 is a ghost.

Meanwhile, in a case where reflective object candidate 1903 is a real reflective object, a reflected wave from reflective object candidate 1903 is weak at an elevation angle lower than the height of mirror reflective object 204, and a reflected wave from reflective object candidate 1903 is strong at an elevation angle higher than the height of mirror reflective object 204: accordingly, shadowing determiner 611b may determine that reflective object candidate 1903 is not a ghost but a real reflective object.

In FIGS. 18 and 19, shadowing determiner 611b outputs an indefinite determination signal because no auxiliary reflective object is detected. Since the output signal from shadowing determiner 611b indicates an indefinite state, geometric ghost determiner 2102 determines whether reflective object candidate 1903 is a ghost based on the output signal from map generator 2101.

From the information on mirror reflective object 204 determined from the output signal of main reflective object detector 603b and the positional relationship between real reflective object 202 and reflective object candidate 1903 displayed on the map, geometric ghost determiner 2102 determines based on whether reflective object candidate 1903 corresponds to the position of a ghost of real reflective object 202 with multipath reflection point 205 as a reflection point. For example, geometric ghost determiner 2102 checks whether reflective object candidate 1903 is present on the line connecting radar apparatus 101b and multipath reflection point 205 and the distance from multipath reflection point 205 to reflective object candidate 1903 is equal to the distance from multipath reflection point 205 to real reflective object 202. When this condition is satisfied, geometric ghost determiner 2102 determines that reflective object candidate 1903 is highly likely to be a ghost.

Note that, in FIG. 19, by generating a single map using the observation results from time $t_0$ to time $t_1$, radar apparatus 101b can create a situation similar to that in FIG. 1 as if two reflective objects and a mirror reflective object are present in a detection area, thereby enabling the geometric determination as described above. In addition to the geometric ghost determination method, it is also suitable to combine with a method of comparing variations in the signal level of reflected waves at different elevation angles.

Figure 20:
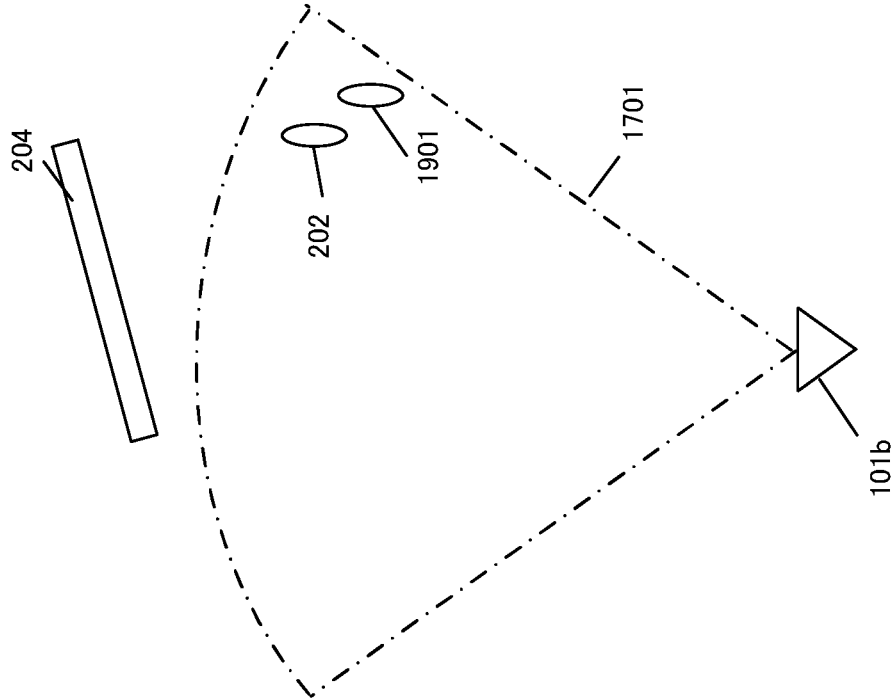
FIG. 20 schematically illustrates another exemplary radar system at time to according to Embodiment 3.
Figure 21:
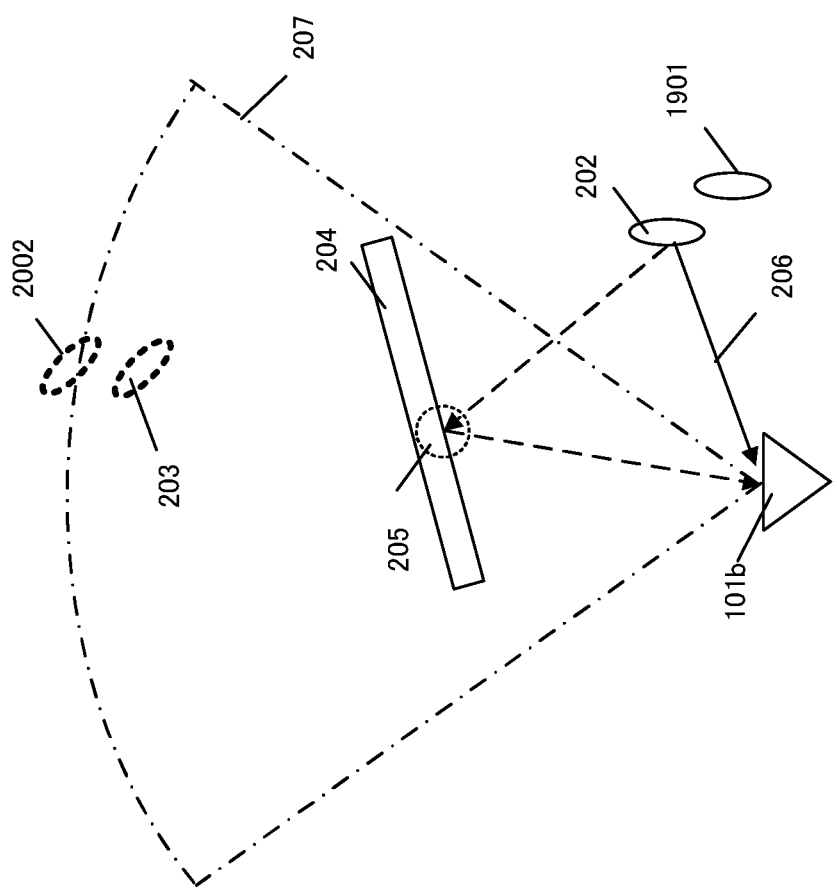
FIG. 21 schematically illustrates another exemplary radar system at time $t_1$ according to Embodiment 3.

Next, a method for determining a ghost using an auxiliary reflective object will be described. FIG. 20 schematically illustrates another exemplary radar system at time to according to Embodiment 3. FIG. 21 schematically illustrates another exemplary radar system at time $t_1$ according to Embodiment 3.

Assuming that radar apparatus 101b is moving straight, in a case where two real reflective objects 202 and 1901 are observed on direct wave routes in detection area 1701 at time to as illustrated in FIG. 20, auxiliary reflective object detector 610b may treat real reflective object 1901 as an auxiliary reflective object.

As illustrated in FIG. 21, shadowing determiner 611b of radar apparatus 101b determines whether a ghost is caused by real reflective objects 202 and 1901 located outside detection area 1701 due to mirror reflective object 204 detected at time $t_1$.

As illustrated in FIG. 21, in a case where real reflective object 1901 is present on the extension of a multipath route of real reflective object 202 located outside detection area 1701, shadowing is caused by reflective object 202 on the multipath route and the signal level of real reflective object 1901 varies. This signal level variation causes a ghost appearing in the position of ghost reflective object 2002.

Next, in radar apparatus 101b, auxiliary reflective object detector 610b determines that real reflective object 1901 is an auxiliary reflective object at time to. Shadowing determiner 611b outputs, to geometric ghost determiner 2102, a determination signal indicating whether shadowing has occurred in the reception signal of ghost reflective object 2002 at time $t_1$, based on the stored position information of real reflective objects 202 and 1901 and the comparison result of the signal level of reflected waves at a plurality of elevation angles at multipath reflection point 205 at time $t_1$.

When the output signal from shadowing determiner 611b indicates that there is shadowing at time $t_1$ in FIG. 21, unlike in Embodiment 1, geometric ghost determiner 2102 determines that ghost reflective objects 203 and 2002, which are determination targets, are ghosts based on the output signals of main reflective object detector 603b and map generator 2101 and the comparison result of the signal level of reflected waves at a plurality of elevation angles at multipath reflection point 205 at time $t_1$.

As described above, estimating the self-position of radar apparatus 101b and generating a map associated with the movement expand a range where the geometric determination can be applied. In this manner, it is also preferable for radar apparatus 101b to comprehensively determine whether it is a ghost in an area with the expanded range.

In a case of the map illustrated in FIG. 21, for example, geometric ghost determiner 2102 outputs a ghost determination signal indicating that ghost reflective object 203 and ghost reflective object 2002 detected at time $t_1$ are highly likely to be ghosts. This is because it can be determined that ghost reflective object 203 is highly likely to be a ghost of real reflective object 202 and ghost reflective object 2002 is highly likely to be a ghost of real reflective object 1901, based on the positional relationship among mirror reflective object 204, real reflective object 202 and real reflective object 1901 detected at time to, and the comparison result of the signal level of reflected waves at a plurality of elevation angles at multipath reflection point 205 at time $t_1$, even though shadowing determiner 611 determines that shadowing occurs for ghost reflective object 2002.

Alternatively, in a case of the map illustrated in FIG. 19, shadowing determiner 611 determines that no ghosting occurs since there is no detection result farther than reflective object candidate 1903 on the line connecting radar apparatus 101b and multipath reflection point 205 of the mirror reflective object. Reflective object candidate 1903 is highly likely to be a ghost of real reflective object 202, however, from the positional relationship between real reflective object 202 detected at time to and mirror reflective object 204 and the comparison result of the signal level of reflected waves at a plurality of elevation angles at multipath reflection point 205 at time $t_1$, and thus geometric ghost determiner 2102 outputs a ghost determination signal to classification processor 612 in the latter stage.

In the present embodiment, in a case where it is difficult to place an auxiliary reflective object in a particular position due to the movement of radar apparatus 101b, radar apparatus 101b can determine whether the determination target is a ghost at present by generating a map that holds past radar detection results and the position information of radar apparatus 101b associated with the movement.

In addition, radar apparatus 101b can input, to a warning determiner, a result of determination whether the determination target is a ghost based on variation in the signal level of real reflective object 1901 present on the extension of a multipath route of real reflective object 202 outside detection area 207.

As described above, radar apparatus 101b can distinguish between a ghost caused by multipath with mirror reflective object 204 as a reflection point and a real reflective object present farther than the reflection point of mirror reflective object 204 from radar apparatus 101b, thereby realizing the radar apparatus that prevents a false detection caused by a ghost. By incorporating radar apparatus 101b, for example, into a road light as an infrastructure radar or into an intrusion detection and monitoring system for suspicious persons as a sensor, it is possible to grasp a situation where a warning is to be issued for preventing a traffic accident or a situation where a suspicious person intrudes.

Note that it is assumed that the intrusion detection and monitoring system for suspicious persons has a wide range of monitoring targets compared to an infrastructure radar, and that various mirror reflective objects are present besides a guardrail, which is a main mirror reflective object for the infrastructure radar. Since a reflective object is possibly present farther than a reflection point of the mirror reflective object, the intrusion detection and monitoring system for suspicious persons performs determination whether it is a ghost or a real reflective object.

When the intrusion detection and monitoring system for suspicious persons detects a reflective object in a detection area and determines that the reflective object is a suspicious person, the system files a report. The intrusion detection and monitoring system for suspicious persons is required to avoid falsely determining a ghost of an object outside the detection area to be a suspicious person as much as possible.

With this regard, applying the radar apparatus of the present disclosure to the intrusion detection and monitoring system for suspicious persons makes it possible to prevent false detection of a ghost, thereby maintaining reliability of the system.

In the embodiments described above, " . . . er (or)" used for each component may be replaced with another term such as " . . . circuit (circuitry)", " . . . device", " . . . unit" and " . . . module".

Although various embodiments have been described above with reference to the drawings, (it goes without saying that) the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

Although the present disclosure has been described using configurations of hardware as examples, the present disclosure can be realized by software in cooperation with hardware.

Each functional block used in the description of each embodiment described above is typically realized by an LSI such as an integrated circuit including an input terminal and an output terminal. The LSI may be individually formed as chips, or one chip may be formed so as to include a part or all of the functional blocks. The LSI here may be referred to as an IC, a system LSI, a super LSI, or an ultra LSI depending on a difference in the degree of integration.

The technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

Summary of Embodiments

A radar apparatus according to an embodiment of the present disclosure includes: transmission circuitry, which, in operation, transmits a radar signal; main reflective object detection circuitry, which, in operation, detects a main reflective object in a detection area using a reflected wave of the radar signal; in-area determination circuitry, which, in operation, determines a main area where a ghost caused by a reflective object outside the detection area and the main reflective object is located, the main area being inside the detection area; and auxiliary reflective object detection circuitry, which, in operation, detects a position of an auxiliary reflective object in the main area using a reception signal of the reflected wave of the radar signal, the auxiliary reflective object being located farther than the main reflective object on an extension of a line connecting the radar apparatus and the main reflective object.

In an embodiment of the present disclosure, the auxiliary reflective object detection circuitry registers a position of an auxiliary reflective object that is added after processing of detecting the auxiliary reflective object.

In an embodiment of the present disclosure, the radar apparatus further includes shadowing determination circuitry, which, in operation, observes a signal level in receiving a reflected wave from the auxiliary reflective object, and determines a determination target to be the ghost when variation in the signal level is equal to or less than a predetermined value, the determination target being detected in the main area and located between the main reflective object and the auxiliary reflective object.

In an embodiment of the present disclosure, the radar apparatus further includes area specification circuitry, which, in operation, extracts an auxiliary area where the ghost is caused, and extracts, within the auxiliary area, the main area where the ghost is caused by the reflective object outside the detection area.

In an embodiment of the present disclosure, the radar apparatus further includes drone detection circuitry, which, in operation, detects a drone, wherein, the in-area determination circuitry determines whether a position of the drone is inside or outside the main area specified in advance, and determines the main area using a reflected wave from the drone when the position of the drone is outside the main area.

A radar system according to an embodiment of the present disclosure includes: a radar apparatus that transmits a radar signal and determines a ghost due to a reflected wave from a reflective object outside a detection area; and an auxiliary reflective object that is placed in the detection area, wherein, the radar apparatus: detects a main reflective object in the detection area using a reflected wave of the radar signal; determines a main area where the ghost caused by the reflective object outside the detection area and the main reflective object is located, the main area being inside the detection area; and detects a position of the auxiliary reflective object in the main area using a reception signal of the reflected wave of the radar signal, the auxiliary reflective object being located farther than the main reflective object on an extension of a line connecting the radar apparatus and the main reflective object.

In an embodiment of the present disclosure, the radar apparatus registers a position of an auxiliary reflective object that is added after processing of detecting the auxiliary reflective object.

In an embodiment of the present disclosure, the radar apparatus observes a signal level in receiving a reflected wave from the auxiliary reflective object, and determines a determination target to be the ghost when variation in the signal level is equal to or less than a predetermined value, the determination target being detected in the main area and located between the main reflective object and the auxiliary reflective object.

The disclosure of Japanese Patent Application No. 2020-094259, filed on May 29, 2020, including the specification, drawings and abstract, is incorporated herein by reference in its entirety.

INDUSTRIAL APPLICABILITY

The present disclosure is applicable to a radar apparatus using a radio signal in a millimeter-wave band, for example.

REFERENCE SIGNS LIST

101 Radar apparatus
102, 202, 303, 1901 Real reflective object
103, 203, 2002 Ghost reflective object
104, 204, 304, 1002, 1502 Mirror reflective object
105, 205 Multipath reflection point
106, 206 Direct wave route
107a, 107b, 208 Multipath route
108, 207, 307, 1003, 1501a, 1501b, 1501c, 1701 Detection area
401, 501 Auxiliary reflective object
601 Antenna
602 Radar signal processor
603 Main reflective object detector
608 Area specifier
1611, 609 In-area determiner
610 Auxiliary reflective object detector
611 Shadowing determiner
612 Classification processor
1004 Ghosting area
1101 Grid pattern
1201 Square
1301 Warning target area
1504 Drone
1606 Ghost detector 1608 Ghosting position storage
1609 Drone detector
1612 Drone controller
1903 Reflective object candidate (ghost or real)
2101 Map generator
2102 Geometric ghost determiner

The invention claimed is:

1. A radar apparatus, comprising:
transmission circuitry, which, in operation, transmits a radar signal;
main reflective object detection circuitry, which, in operation, detects a main reflective object in a detection area using a reflected wave of the radar signal;
in-area determination circuitry, which, in operation, determines a main area where a ghost caused by a reflective object outside the detection area and the main reflective object are located, the main area being inside the detection area; and
auxiliary reflective object detection circuitry, which, in operation, detects a position of an auxiliary reflective object in the main area using a reception signal of the reflected wave of the radar signal,
wherein the auxiliary reflective object is different from the main reflecting object, and is located farther than the main reflective object on an extension of a line connecting the radar apparatus and the main reflective object.

2. The radar apparatus according to claim 1, wherein the auxiliary reflective object detection circuitry registers a position of a second auxiliary reflective object that is added after processing of detecting the auxiliary reflective object.

3. The radar apparatus according to claim 1, further comprising:
shadowing determination circuitry, which, in operation, observes a signal level in receiving the reflected wave from the auxiliary reflective object, and determines a determination target to be the ghost when variation in the signal level is equal to or less than a predetermined value, the determination target being detected in the main area and located between the main reflective object and the auxiliary reflective object.

4. The radar apparatus according to claim 1, further comprising:
area specification circuitry, which, in operation, extracts an auxiliary area where the ghost is caused, and extracts, within the auxiliary area, the main area where the ghost is caused by the reflective object outside the detection area.

5. The radar apparatus according to claim 1, wherein the in-area determination circuitry determines the main area based on a Doppler component of a drone flying outside the detection area.

6. A radar system, comprising:
a radar apparatus that transmits a radar signal and determines a ghost due to a reflected wave from a reflective object outside a detection area; and
an auxiliary reflective object that is placed in the detection area, wherein, the radar apparatus:
detects a main reflective object in the detection area using a reflected wave of the radar signal;
determines a main area where the ghost caused by the reflective object outside the detection area and the main reflective object are located, the main area being inside the detection area; and
detects a position of the auxiliary reflective object in the main area using a reception signal of the reflected wave of the radar signal, the auxiliary reflective object being different from the main reflecting object, and being located farther than the main reflective object on an extension of a line connecting the radar apparatus and the main reflective object.

7. The radar system according to claim 6, wherein the radar apparatus registers a position of a second auxiliary reflective object that is added after processing of detecting the auxiliary reflective object.

8. The radar system according to claim 6, wherein the radar apparatus observes a signal level in receiving the reflected wave from the auxiliary reflective object, and determines a determination target to be the ghost when variation in the signal level is equal to or less than a predetermined value, the determination target being detected in the main area and located between the main reflective object and the auxiliary reflective object.

* * * * *